(12) United States Patent
Sawada

(10) Patent No.: US 7,864,696 B2
(45) Date of Patent: Jan. 4, 2011

(54) COMMUNICATION APPARATUS, COMMUNICATION METHOD, PROGRAM FOR CONTROLLING COMMUNICATION APPARATUS, STORAGE MEDIUM STORING PROGRAM

(75) Inventor: Tetsuya Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 11/779,539

(22) Filed: Jul. 18, 2007

(65) Prior Publication Data

US 2008/0025324 A1     Jan. 31, 2008

(30) Foreign Application Priority Data

Jul. 31, 2006     (JP)     ............... 2006-208496

(51) Int. Cl.
H04L 12/26     (2006.01)
G06F 15/173   (2006.01)

(52) U.S. Cl. ................... 370/252; 370/338; 709/223; 709/224

(58) Field of Classification Search ........... 370/252, 370/400, 229–231, 328, 338, 431, 447, 461; 709/220, 221, 223–226, 230, 232, 321
See application file for complete search history.

(56) References Cited

U.S. PATENT DOCUMENTS

| 7,315,898 | B2* | 1/2008 | Kohno | 709/230 |
| 7,450,940 | B2* | 11/2008 | Myers et al. | 455/432.1 |
| 2001/0010329 | A1* | 8/2001 | Ohashi | 235/375 |
| 2004/0151126 | A1* | 8/2004 | Matsubara | 370/252 |
| 2004/0240405 | A1 | 12/2004 | Okazaki | |
| 2005/0271063 | A1* | 12/2005 | Yokoyama | 370/395.54 |
| 2006/0114873 | A1* | 6/2006 | Fujii et al. | 370/338 |
| 2006/0120313 | A1* | 6/2006 | Moritomo et al. | 370/311 |
| 2006/0126531 | A1* | 6/2006 | Myojo et al. | 370/252 |
| 2006/0133401 | A1* | 6/2006 | Ise et al. | 370/428 |
| 2006/0146826 | A1* | 7/2006 | Namihira | 370/392 |
| 2006/0233191 | A1* | 10/2006 | Pirzada et al. | 370/463 |
| 2006/0251256 | A1* | 11/2006 | Asokan et al. | 380/270 |

(Continued)

FOREIGN PATENT DOCUMENTS

CN     1663189 A     8/2005

(Continued)

OTHER PUBLICATIONS

The above references were cited in a Feb. 12, 2010 Chinese Office Action, which is enclosed with English Translation, that issued in Chinese Patent Application No. 200710143436.6.

Primary Examiner—Chi H Pham
Assistant Examiner—Robert Lopata
(74) Attorney, Agent, or Firm—Cowan, Liebowitz & Latman, P.C.

(57) ABSTRACT

When a station, which associates itself in a wireless network, wants to make transmission/reception of traffic with a certain characteristic, it makes the transmission/reception as it expects. To this end, a communication apparatus which has an access point function and station function determines if the transmission/reception of the traffic with the certain characteristic can be made in the existing wireless network. If that transmission/reception cannot be made in the existing network based on the determination result, the apparatus serves as the access point function to create a network, and communicates with a communication partner using the created network.

18 Claims, 19 Drawing Sheets

U.S. PATENT DOCUMENTS

| | | | |
|---|---|---|---|
| 2007/0046495 A1* | 3/2007 | Kumagai | 340/825.72 |
| 2007/0140197 A1* | 6/2007 | Sawada | 370/338 |
| 2007/0160055 A1* | 7/2007 | Takahashi | 370/395.2 |
| 2008/0112351 A1* | 5/2008 | Surineni et al. | 370/312 |
| 2008/0146240 A1* | 6/2008 | Trudeau | 455/445 |
| 2008/0186898 A1* | 8/2008 | Petite | 370/315 |
| 2009/0034535 A1* | 2/2009 | Yokoyama | 370/395.54 |
| 2009/0092068 A1* | 4/2009 | Moritomo et al. | 370/311 |
| 2009/0180425 A1* | 7/2009 | Watanabe | 370/328 |
| 2010/0202426 A1* | 8/2010 | Matsuda et al. | 370/338 |

FOREIGN PATENT DOCUMENTS

| | | |
|---|---|---|
| JP | 2004-349777 | 12/2004 |
| JP | 2004-363645 | 12/2004 |

* cited by examiner

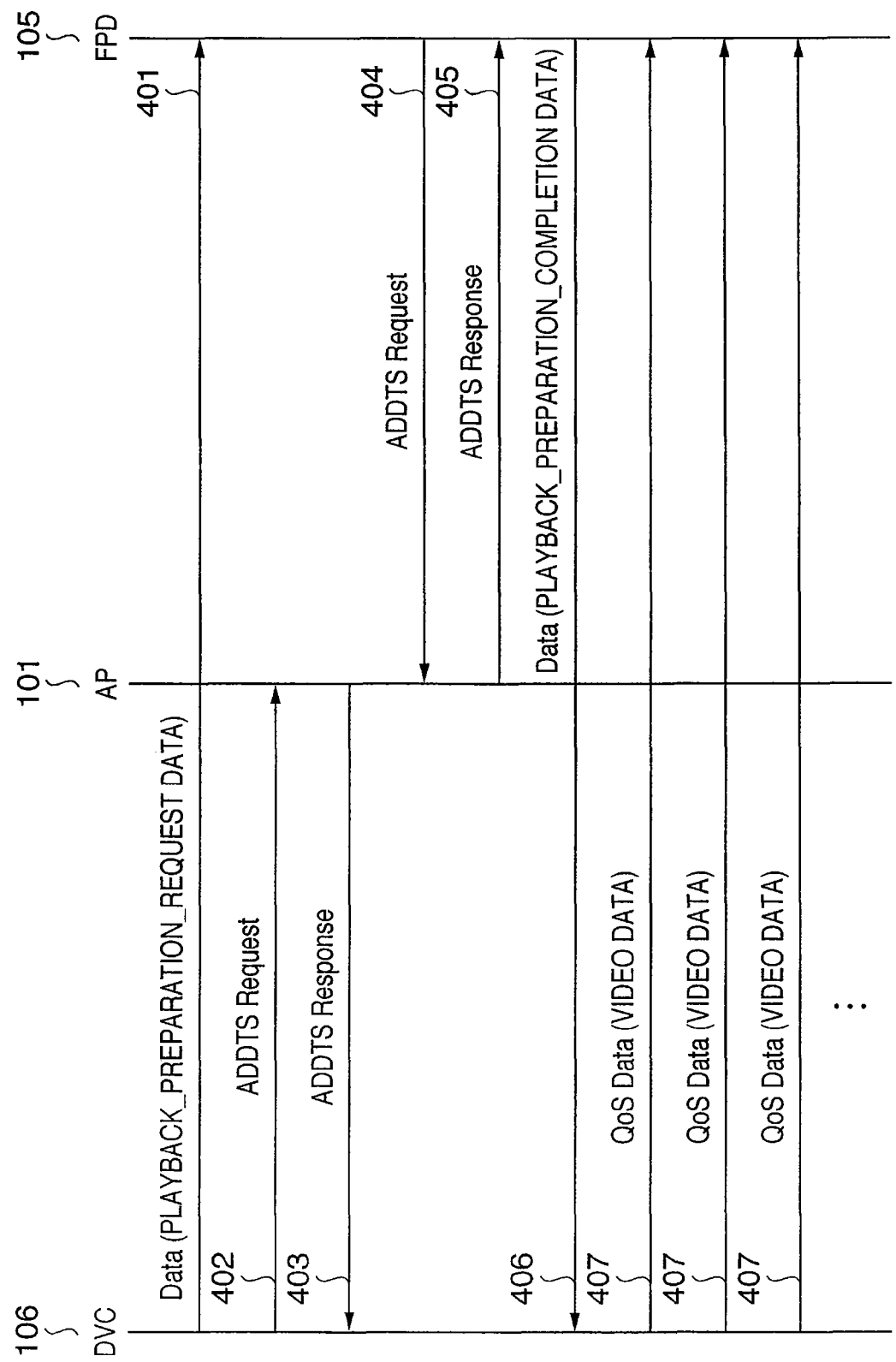

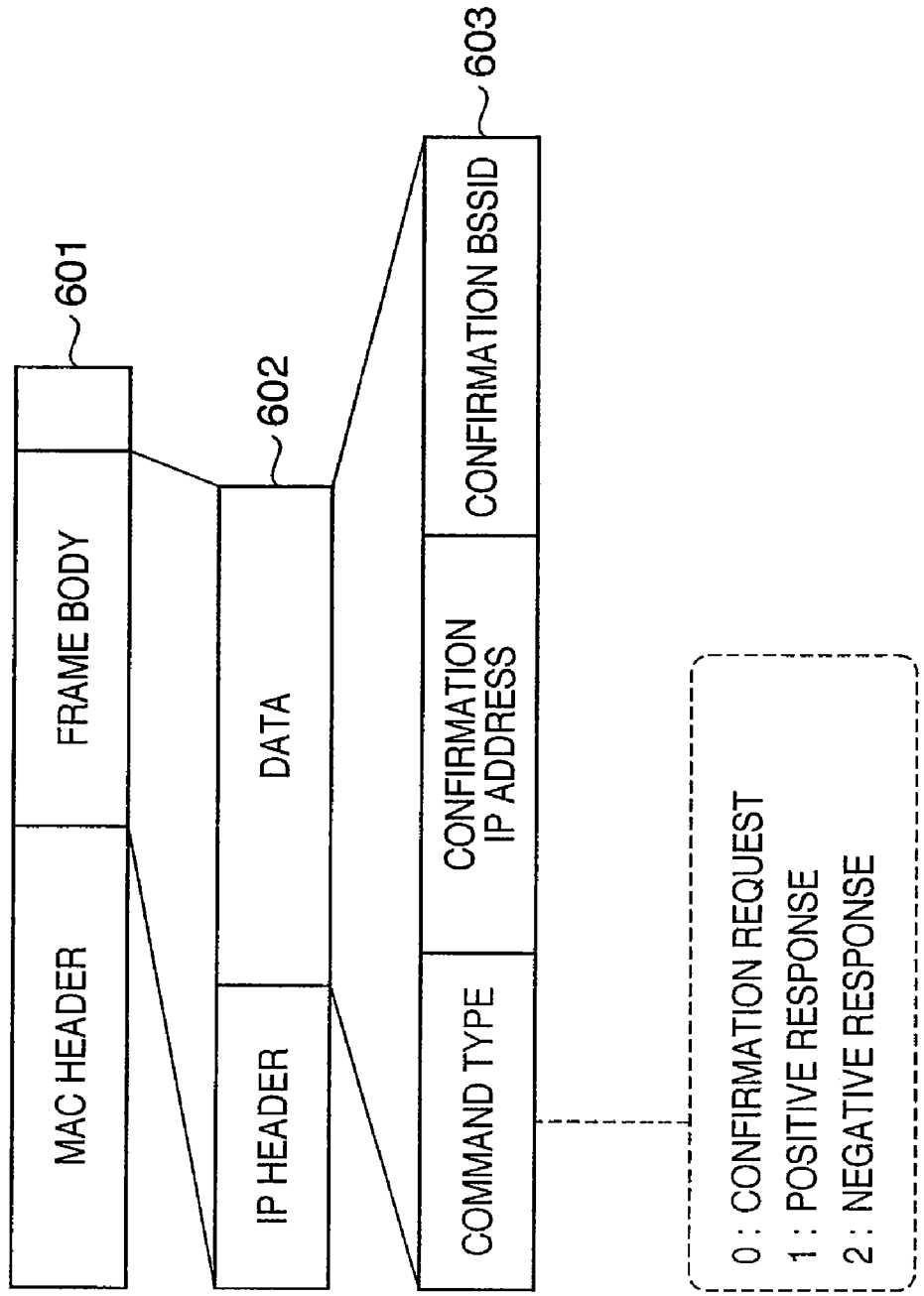

COMMUNICATION APPARATUS, COMMUNICATION METHOD, PROGRAM FOR CONTROLLING COMMUNICATION APPARATUS, STORAGE MEDIUM STORING PROGRAM

BACKGROUND OF THE INVENTION

1. Field of the Invention

The present invention relates to a communication apparatus, which makes communications in a network different from an existing network, a communication method, a program for controlling the communication apparatus, and a storage medium that stores the program.

2. Description of the Related Art

Conventionally, Japanese Patent Laid-Open No. 2004-349777 discloses a technique which switches a communication in an infrastructure mode and that in an ad-hoc mode in accordance with an expected traffic amount when communicating using a communication apparatus compatible to the IEEE802.11 standard.

Also, Japanese Patent Laid-Open No. 2004-363645 (US Patent Application No. 2004240405) discloses a technique which switches a communication via an access point, and a direct link communication that allows stations to directly communicate with each other.

The IEEE802.11e standard provides a scheme that allows an access point to execute traffic flow rate control. With this scheme, a station which is permitted by the access point to make transmission/reception of traffic with a certain characteristic can make transmission/reception guaranteed with high quality of communication (QoS: Quality of Service).

Upon switching to the ad-hoc mode, since the ad-hoc mode cannot make a communication that can assure QoS, if transmission/reception of traffic with a certain characteristic is desired, such transmission/reception cannot always be made as expected.

Upon switching to the direct link mode, if another station has already made a communication with a large traffic amount, the surplus frequency band of the network is small, and the access point does not often permit the station of interest to make a communication of a desired traffic amount. Even if such communication is permitted, since the flow rate control is committed to the access point, the station of interest cannot make transmission/reception as expected. Therefore, upon switching to the direct link mode, if a given station desires to make transmission/reception of traffic with a certain characteristic, the result is not always as expected.

SUMMARY OF THE INVENTION

It is an object of the present invention to allow making transmission/reception of traffic with a certain characteristic perform as expected.

According to one aspect of the present invention, a communication apparatus, which has a management function of creating and managing a network, and a function to be managed, comprises: a determination unit adapted to determine whether or not a communication of a specific traffic characteristic can be made in a communication in the function to be managed; a creating unit adapted to create a network by the management function in accordance with the determination result of the determination unit; and a communication unit adapted to serve as a management apparatus in the network created by the creating unit and to communicate with a communication partner.

According to another aspect of the present invention, a communication apparatus which associates itself in a network created by a management apparatus that creates and manages a network, as an apparatus to be managed, the apparatus comprises: a reception unit adapted to receive information which is transmitted from another communication apparatus that serves as an apparatus to be managed under management of a first management apparatus, and is associated with a network to be created by the other communication apparatus; a confirmation unit adapted to confirm if the other communication apparatus creates the network as a second management apparatus; and an associating unit adapted to associate the apparatus in the network confirmed by the confirmation unit.

According to still another aspect of the present invention, a communication method for a communication apparatus, which has a management function of creating and managing a network, and a function to be managed, the method comprises: a determination step of determining whether or not a communication of a specific traffic characteristic can be made in a communication in the function to be managed; a creating step of creating a network by the management function in accordance with the determination result in the determination step; and a communication step of making the communication apparatus serve as a management apparatus in the network created in the creating step and communicate with a communication partner.

According to yet another aspect of the present invention, a communication method for a communication apparatus, which associates itself in a network created by a management apparatus that creates and manages a network, as an apparatus to be managed, the method comprises: a reception step of receiving information which is transmitted from another communication apparatus that serves as an apparatus to be managed under management of a first management apparatus, and is associated with a network to be created by the other communication apparatus; a confirmation step of confirming if the other communication apparatus creates the network as a second management apparatus; and an associating step of associating the communication apparatus in the network confirmed in the confirmation step.

According to still another aspect of the present invention, a program for making a computer control a communication apparatus, which has a management function of creating and managing a network, and a function to be managed, the program comprises: a determination step of determining whether or not a communication of a specific traffic characteristic can be made in a communication in the function to be managed; a creating step of creating a network by the management function in accordance with the determination result in the determination step; and a communication step of making the communication apparatus serve as a management apparatus in the network created in the creating step and communicate with a communication partner.

According to yet another aspect of the present invention, a program for making a computer control a communication apparatus, which associates itself in a network created by a management apparatus that creates and manages a network, as an apparatus to be managed, the program comprises: a reception step of receiving information which is transmitted from another communication apparatus that serves as an apparatus to be managed under management of a first management apparatus, and is associated with a network to be created by the other communication apparatus; a confirmation step of confirming if the other communication apparatus creates the network as a second management apparatus; and an associating step of associating the communication apparatus in the network confirmed in the confirmation step.

Transmission/reception of traffic with a certain characteristic can be made to perform as expected.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a sequence chart until video playback when an access point (AP) 101 can assure traffic of video data according to the first through the third embodiments;

FIG. 6 shows the configuration of a station_confirmation_request message and response according to the first through the third embodiments;

DESCRIPTION OF THE EMBODIMENTS

First Embodiment

The first embodiment of the present invention will be described hereinafter.

Figure 1:
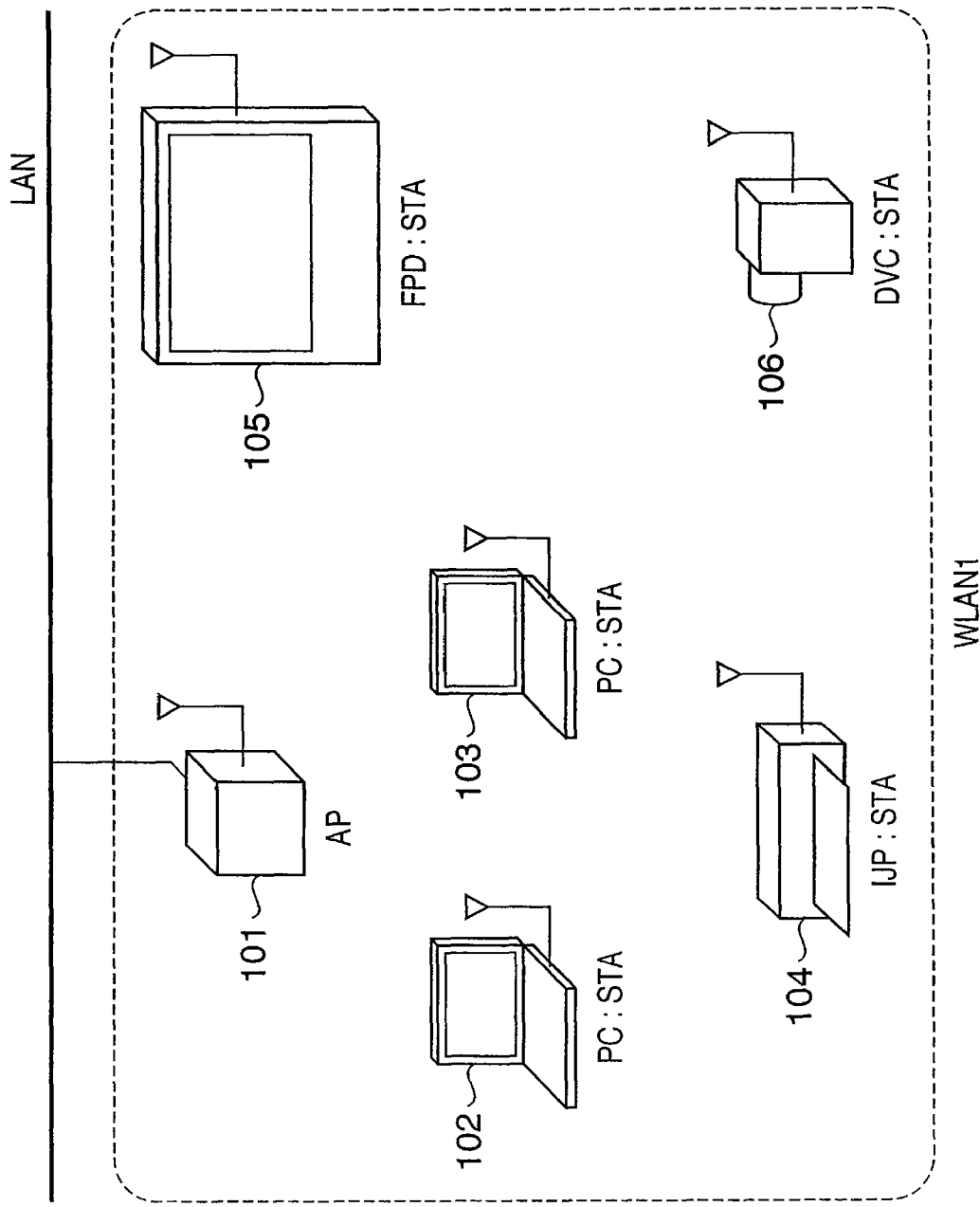
FIG. 1 is a diagram showing the configuration of a network (WLAN1) according to the first through the third embodiments.

FIG. 1 is a diagram showing the configuration of a wireless LAN (WLAN) 1 as a first wireless network. Reference numeral 101 denotes an access point (AP). Reference numerals 102 and 103 denote personal computers (PCs). Reference numeral 104 denotes an ink-jet printer (IJP). Reference numeral 105 denotes a flat panel display (FPD). Reference numeral 106 denotes a digital video camera (DVC). Note that the AP 101, PC 102, PC 103, IJP 104, FPD 105, and DVC 106 comprise a wireless communication function compliant with the IEEE802.11 standard and the IEEE802.11e standard. The AP 101 creates and manages a wireless network (WLAN1) by an access point function. The PC 102, PC 103, IJP 104, FPD 105, and DVC 106 associate themselves in the WLAN1 created and managed by the AP 101 by a station function. The AP 101 also relays a wired network LAN, and stations that associate themselves in the WLAN1 can communicate with devices that associate themselves in the LAN via the AP 101.

Figure 2:
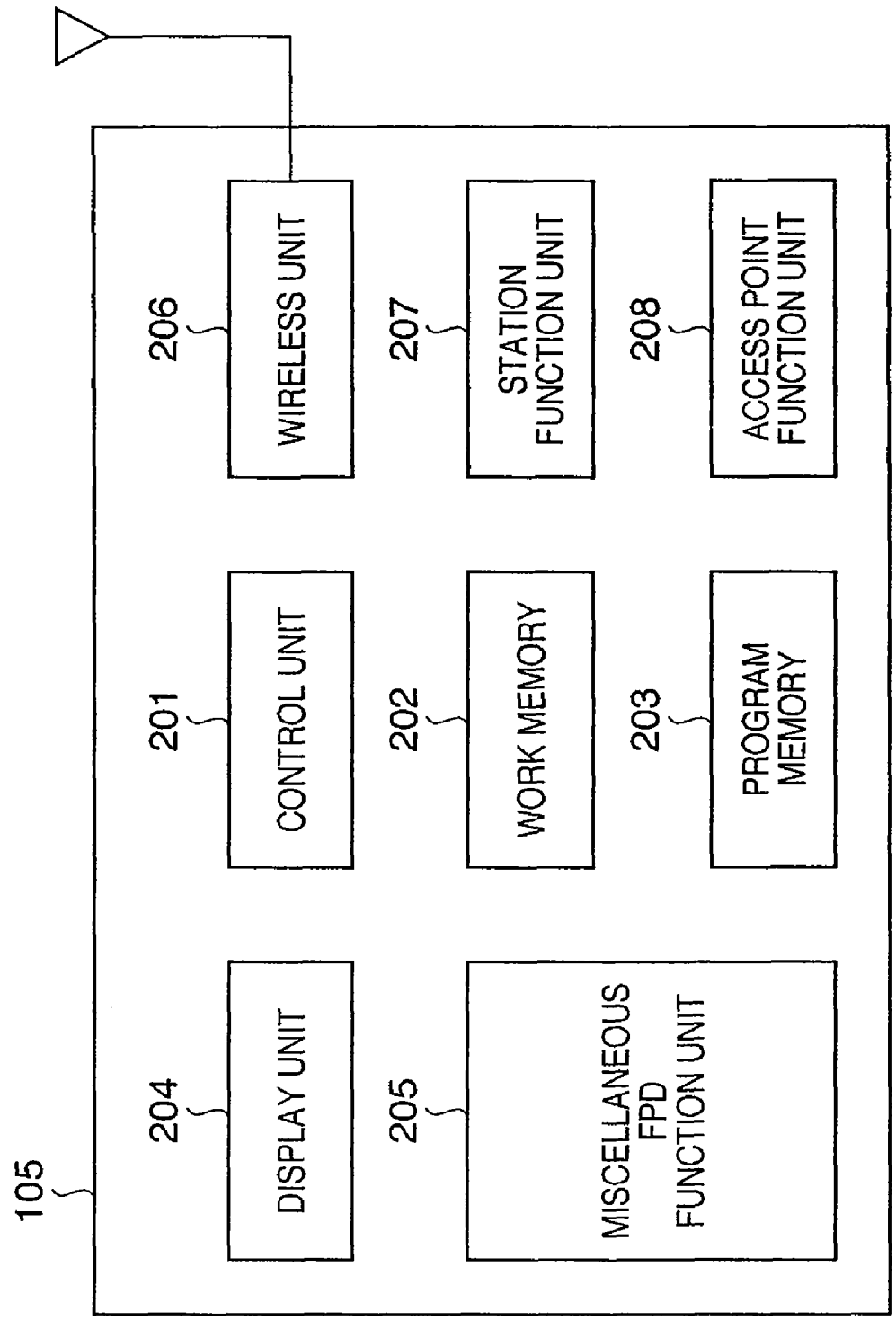
FIG. 2 is a block diagram showing the arrangement of a flat panel display (FPD) having an access point function and a station function according to the first through the third embodiments.

FIG. 2 is a block diagram showing the arrangement of the FPD 105. Referring to FIG. 2, reference numeral 201 denotes a control unit that controls the overall operation of the FPD 105, and comprises a CPU (Central Processing Unit) and its peripheral circuits. Reference numeral 202 denotes a work memory that is used as a work area when the control unit 201 calls program, and comprises a Random Access Memory (RAM). Reference numeral 203 denotes a program memory that stores programs used to control the FPD 105, and comprises a Read Only Memory (ROM). Reference numeral 204 denotes a display unit that displays video pictures and comprises a Liquid Crystal Display (LCD). Reference numeral 205 denotes a miscellaneous FPD function unit which implements the functions of the FPD 105 and comprises a tuner for receiving video pictures, a decoder for decoding the received video pictures, a loudspeaker for outputting sound, an operation unit, and the like. Reference numeral 206 denotes a wireless unit that makes wireless transmission/reception prescribed by the IEEE802.11 standard and the IEEE802.11e standard, and comprises a wireless LAN chip and antenna. Reference numeral 207 denotes a station function unit which implements a station function prescribed by the IEEE802.11 standard and the IEEE802.11e standard, and comprises a ROM that stores programs for controlling a station. Note that the station function unit 207 also stores a program for processing flow control, to be described hereinafter, processed while the station function is active. Reference numeral 208 denotes an access point function unit which implements an access point function prescribed by the IEEE802.11 standard and the IEEE802.11e standard, and comprises a ROM that stores programs for controlling an access point. Note that the access point function unit 208 also stores a program for processing flow control, to be described hereinafter, which is processed while the access point function is active.

Figure 3:
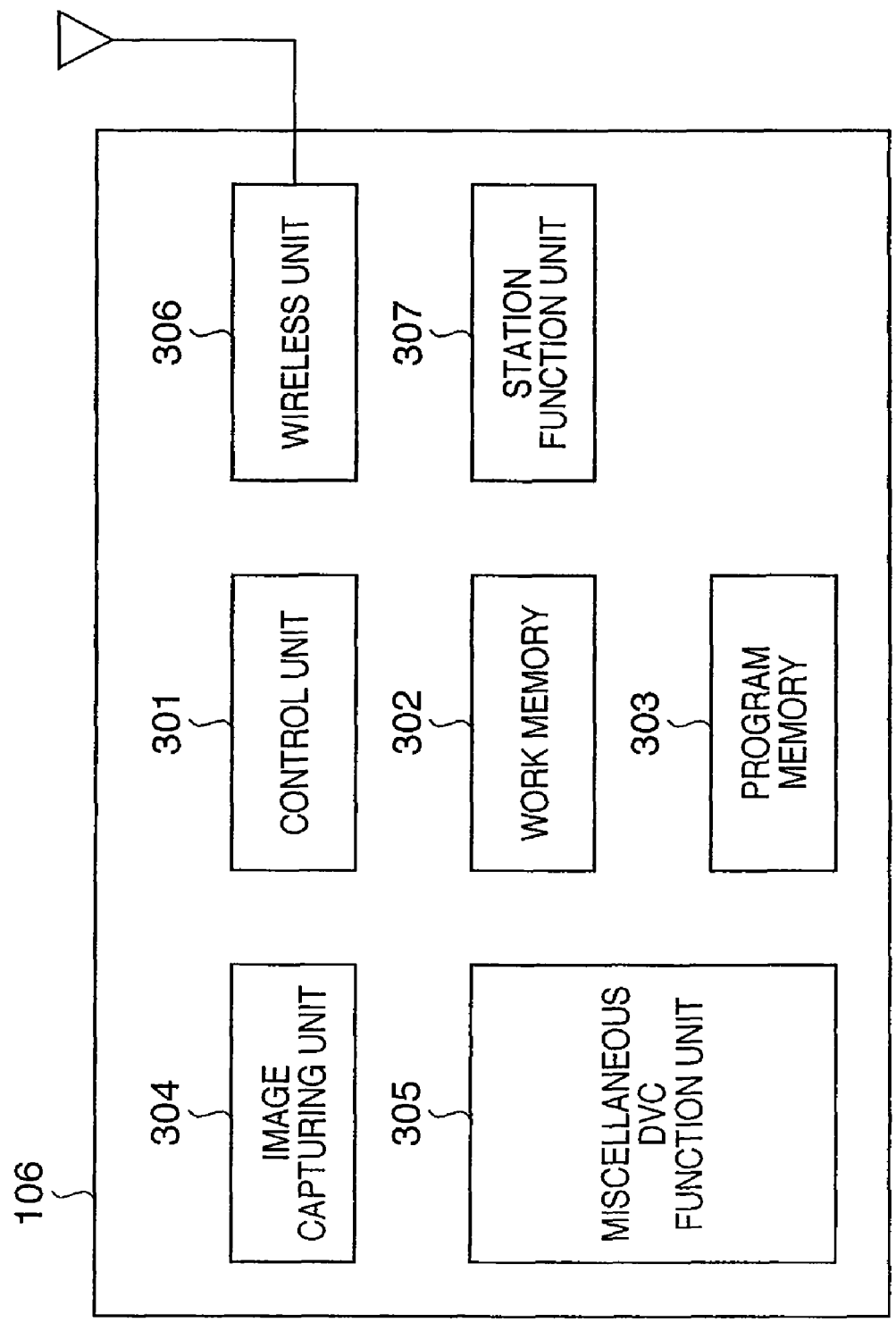
FIG. 3 is a block diagram showing the arrangement of a digital video camera (DVC) having a station function according to the first through the third embodiments.

FIG. 3 is a block diagram showing the arrangement of the DVC 106. Referring to FIG. 3, reference numeral 301 denotes a control unit that controls the overall operation of the DVC 106, and comprises a CPU and its peripheral circuits. Reference numeral 302 denotes a work memory that is used as a work area when the control unit 301 calls program, and comprises a RAM. Reference numeral 303 denotes a program memory that stores programs used to control the DVC 106, and comprises a ROM. Reference numeral 304 denotes an image capturing unit which captures a video picture, and comprises a lens, Charge Coupled Device (CCD), and the like. Reference numeral 305 denotes a miscellaneous DVC function unit which implements the functions of the DVC 106 and comprises a hard disk that records video pictures, an encoder that encodes the video pictures, a microphone that inputs a sound, an operation unit, and the like. Reference numeral 306 denotes a wireless unit that makes wireless transmission/reception prescribed by the IEEE802.11 standard and the IEEE802.11e standard, and comprises a wireless LAN chip and antenna. Reference numeral 307 denotes a station function unit which implements a station function prescribed by the IEEE802.11 standard and the IEEE802.11e standard, and comprises a ROM that stores programs for controlling a station. Note that the station function unit 307 also stores a program for processing flow control, to be described hereinafter, which is processed while the station function is active.

FIG. 4 is a sequence chart until the FPD 105 plays back video data of the DVC 106. The FPD 105 and the DVC 106 operate while activating the station function units 207 and 307.

When the user inputs a playback instruction of video data using the FPD 105 at the operation unit of the DVC 106, the DVC 106 sends playback_preparation_request data 401 to the FPD 105 via the AP 101. The playback_preparation_request data is a signal that is transmitted using a Data frame, and requests the FPD 105 to prepare for playback. The playback_preparation_request data 401 includes a data rate request in transmission of video data 407 from the DVC 106 to the FPD 105, and various kinds of information that request the AP 101 to guarantee QoS (Quality of Service).

The DVC 106 sends an ADDTS_Request message 402 to the AP 101 to request permission for the QoS-guaranteed transmission for traffic of the video data 407. The ADDTS_Request message 402 includes a TSPEC parameter that describes the traffic characteristic of the video data 407. Furthermore, the TSPEC parameter includes Mean_Data_Rate information, indicating the requested transmission data rate. Assume that in the ADDTS_Request message 402 transmitted from the DVC 106 to the AP 101, the Mean_Data_Rate information signifies 8 Mbps. That is, the ADDTS_Request message 402 requests to guarantee a transmission data rate of 8 Mbps.

Upon reception of the ADDTS_Request message 402, the AP 101 checks the traffic requested by the DVC 106, in order to determine whether to permit or deny guarantee of the QoS. In such a circumstance, the AP 101 checks whether or not to permit a communication that guaranteed at the requested transmission data rate. The AP 101 transmits an ADDTS_Response message 403 as a response to the ADDTS_Request message 402. Note that the AP 101 permits guaranteeing the requested QoS in the present circumstance.

Upon reception of the playback_preparation_request data 401, the FPD 105 discriminates the transmission data rate requested in transmission of the video data 407 sent from the DVC 106, based on the content of the received playback_preparation_request data 401. The FPD 105 transmits an ADDTS_Request message 404 to the AP 101, and requests the AP 101 to permit the QoS-guaranteed reception. Note that Mean_Data_Rate information requested by the ADDTS_Request message 404 is 8 Mbps decided based on the playback_preparation request data 401.

Upon reception of the ADDTS_Request message 404, the AP 101 checks for the traffic requested by the FPD 106 whether to permit or deny guarantee of the QoS. Then, the AP 101 transmits an ADDTS_Response message 405 as a response to the ADDTS_Request message 404. It is presumed that the AP 101 permits guaranteeing the requested QoS.

Upon reception of the ADDTS_Response message 405 that indicates that permission has been granted, the FPD 105 transmits playback_preparation_completion data 406 that notifies the DVC 106 of completion of playback preparation to the DVC 106 via the AP 101. The playback_preparation_completion data 406 is a signal that is transmitted using a Data frame, and which notifies the DVC 106 of completion of playback preparation. Upon reception of the playback_preparation_completion data 406, when the AP 101 permits guarantee of the QoS that the DVC 106 requests the AP 101, the DVC 106 begins to transmit the traffic of the video data 407 to the FPD 105 via the AP 101. The traffic of the video data is transmitted using a QoS Data frame. Thus, the FPD 105 plays back a video data stream from the DVC 106. In such a circumstance, the DVC 106 and the FPD 105 transmit and receive the traffic of the video data 407 while the AP 101 permits guaranteeing the QoS at 8 Mbps.

An example in which the FPD 105 creates a new network (WLAN2) in place of the traffic communication of the video data 407 via the AP 101 made by the DVC 106 and FPD 105, as described above using FIG. 4, will be described hereinafter.

Figure 5A:
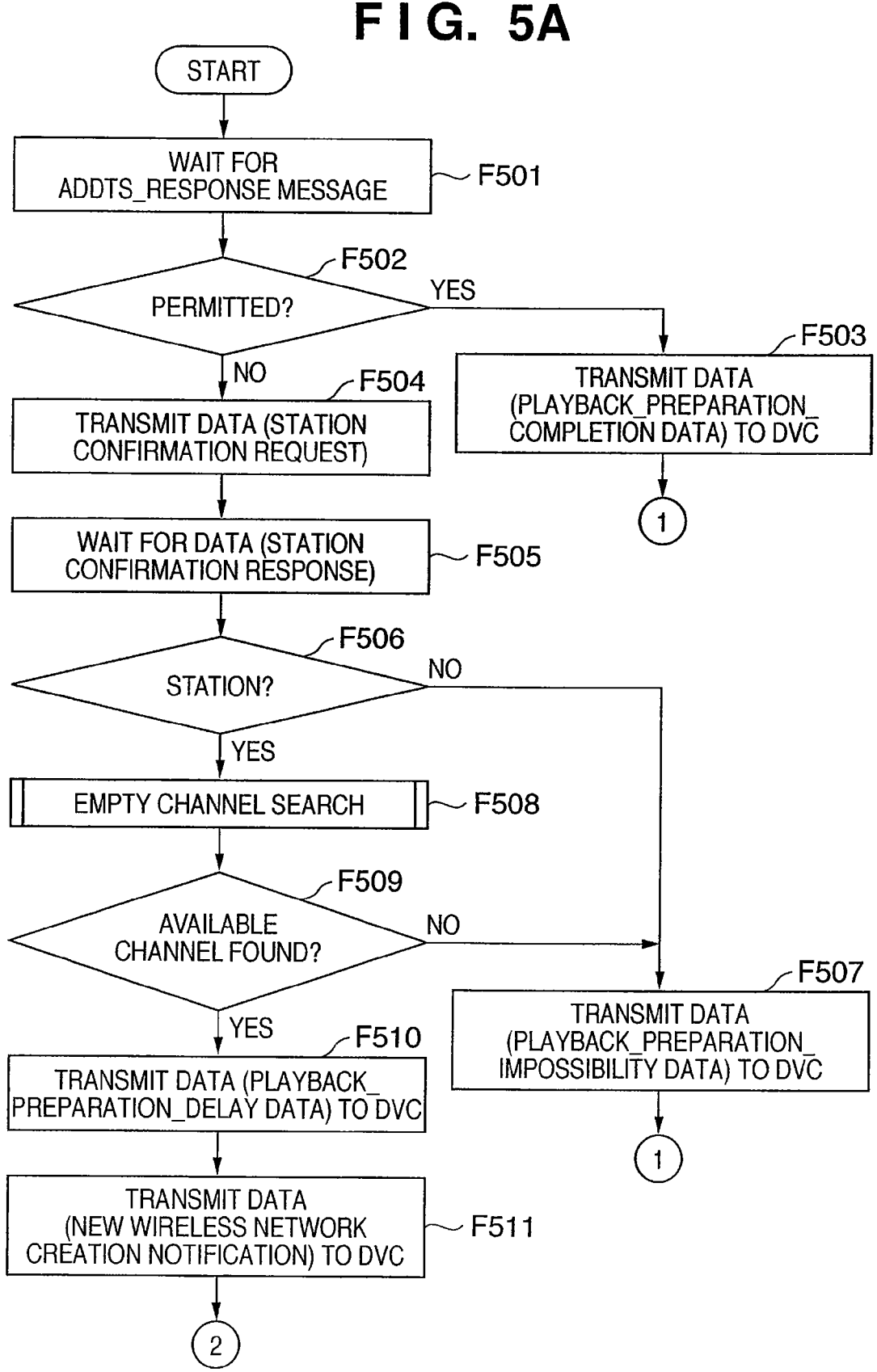
FIG. 5A and FIG. 5B are flowcharts executed when a flat panel display (FPD) 105 establishes or creates a new network (WLAN2) according to the first embodiment.
Figure 5B:
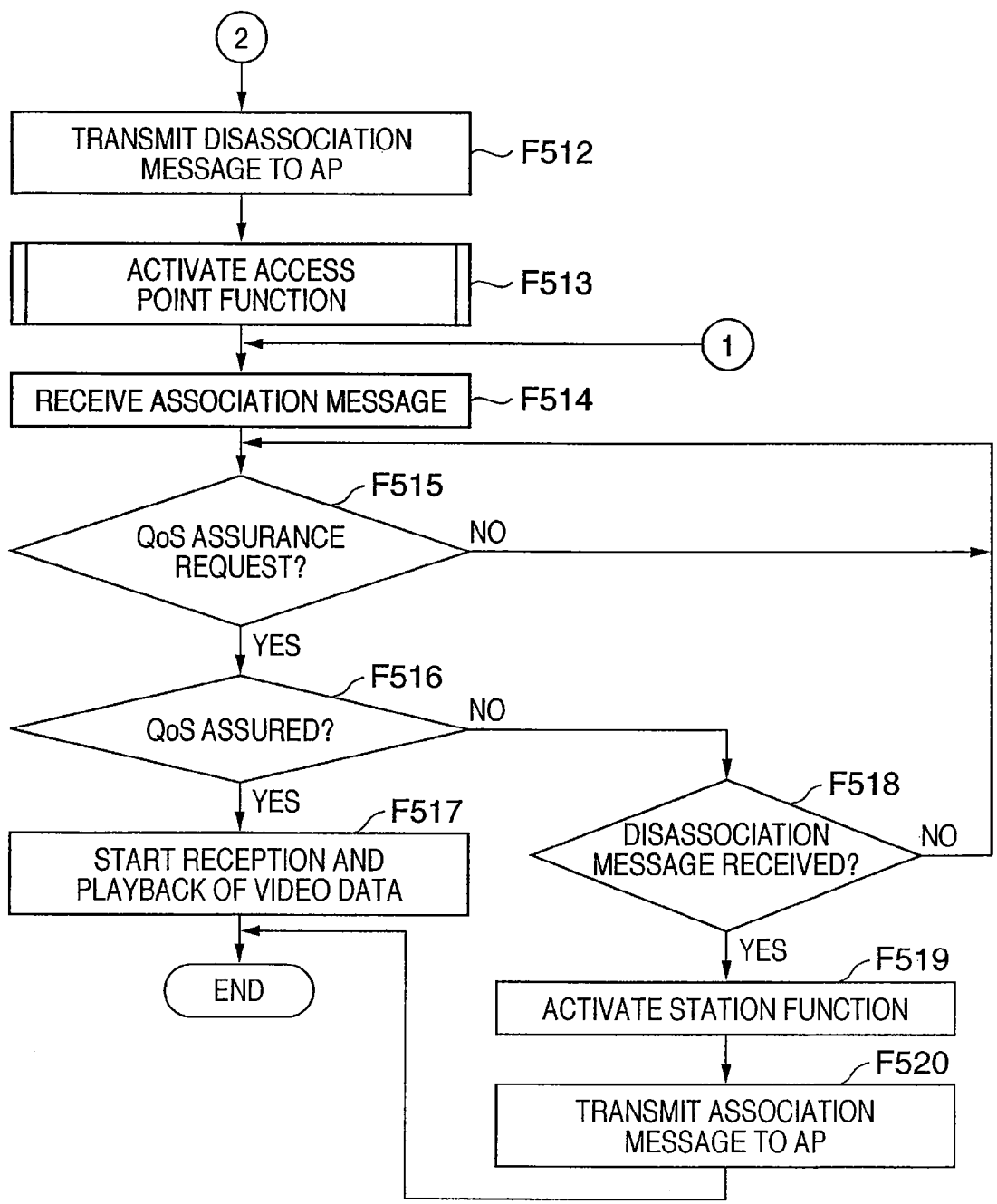

FIG. 5A and FIG. 5B are flowcharts when the FPD 105, which operates while activating the station function unit 207, activates the access point function unit 208 so as to create the WLAN2 as a second wireless network. The flow control is implemented when the control unit 201 of the FPD 105 controls the wireless unit 206, station function unit 207, and access point function unit 208 in accordance with the programs stored in the program memory 203. The station function unit 207 and the access point function unit 208 execute control according to programs stored therein under the control of the control unit 201. The flow control shown in FIG. 5A starts immediately after, e.g., the transmission of the ADDTS_Request message 404 in FIG. 4.

The FPD 105 waits for the ADDTS_Response message 405 from the AP 101 (F501). The FPD 105 then analyzes the received ADDTS_Response message 405 and confirms whether or not the QoS-guaranteed reception is permitted, with regard to the traffic of the video data 407 (F502). If the QoS-guaranteed reception is permitted, the FPD 105 transmits the playback_preparation_completion data 406 in FIG. 4 (F503), and communicates the traffic of the video data 407 with the DVC 106 as in FIG. 4.

On the other hand, if the QoS-guaranteed reception is denied as a result of the confirmation in step F502, the FPD 105 transmits a station_confirmation_request message to the DVC 106 via the AP 101 (F504). The station_confirmation_request message is a signal which is transmitted using a Data frame, and is used to confirm if the DVC 106 associates itself in the WLAN1. Then, the FPD 105 waits for a response to the station_confirmation_request message (F505). The station_confirmation_request message and station_confirmation_response message will be described hereinafter.

Upon reception of the station_confirmation_response message from the DVC 106, the FPD 105 analyzes the received response, and confirms whether the DVC 106 associates itself in the WLAN1, i.e., whether is a station of the WLAN1 (F506). If the DVC 106 is not a station of the WLAN1, the FPD 105 transmits playback_preparation_impossibility data that notifies the DVC 106 that playback preparation cannot be made to the DVC 106 via the AP 101 in place of the playback_preparation_completion data 406 in FIG. 4 (F507), and ends the processing. Upon transmitting the playback_preparation_impossibility data to the DVC 106, the DVC 106 does not start transmission of the traffic of the video data 407 unlike in FIG. 4.

On the other hand, if the DVC 106 is a station of the WLAN1, the FPD 105 executes empty wireless channel search processing (F508). The empty channel search processing will be described hereinafter. After the empty channel search processing, the FPD 105 confirms if an available channel is found (F509). If an available channel is not found, the process advances to step F507 to transmit the playback_preparation_impossibility data, thus ending the processing. If an available channel is found, the FPD 105 transmits playback_preparation_delay data that notifies the DVC 106 of delay of playback preparation to the DVC 106 via the AP 101 in place of the playback_preparation_completion data 406 in FIG. 4 (F510). In such a circumstance too, the DVC 106 does not start transmission of the traffic of the video data 407, unlike in FIG. 4.

Subsequently, the FPD 105 transmits a new wireless network creation notification to the DVC 106 via the AP 101 (F511). The new wireless network creation notification is a signal which is transmitted using a Data frame and notifies the DVC 106 of creation of WLAN2 as a new wireless network. The new wireless network creation notification will be described hereinafter. The FPD 105 then transmits a Disassociation message indicating disassociation from the WLAN1 to the AP 101 (F512), and disassociates itself from the WLAN1. After disassociation from the WLAN1, the FPD 105 executes activation processing of the access point function unit 208 so as to create a solitary WLAN2 (F513). The activation processing of the access point function unit 208 will be described hereinafter.

Upon reception of an Association message from the DVC 106 after the access point function unit 208 is activated as an access point, the FPD 105 permits association of the DVC 106 to the WLAN1 (F514). Thereafter, upon reception of an ADDTS_Request message corresponding to the ADDTS_Request message 402 from the DVC 106, which requests the FPD 105 to permit QoS-guaranteed transmission for the traffic of the video data 407 (F515), the FPD 105 confirms whether or not to guarantee the requested QoS (F516). Note that the FPD 105 is more likely to guarantee the requested QoS, since it finds an available channel in steps F508 and F509 and creates the new network (WLAN2) using that channel. If the requested QoS can be guaranteed, the FPD 105 guarantees the requested QoS, and notifies the DVC 106 that the QoS is guaranteed, using an ADDTS_Response message corresponding to the ADDTS_Response message 403. Thereafter, the FPD 105 receives the traffic of the video data 407 from the DVC 106 while the guarantee of the QoS is permitted, i.e., the QoS is guaranteed.

If the requested QoS cannot be guaranteed, the FPD 105 notifies the DVC 106 that the requested QoS cannot be guaranteed using an ADDTS_Response message corresponding to the ADDTS_Response message 403. Since the guarantee of the requested QoS is not permitted, the DVC 106 transmits a Disassociation message to the FPD 105 and disassociates itself from the WLAN2. Upon reception of the Disassociation message (F518), the FPD 105 confirms disassociation of the DVC 106 from the WLAN2. After confirmation of disassociation from the WLAN2, the FPD 105 halts the operation of the access point function unit 208 and activates the station function unit 207 again (F519). The FPD 105 transmits an Association message to the AP 101 and associates itself in the WLAN1 created by the AP 101 (F520).

FIG. 6 shows the configuration of the station_confirmation_request message and response exchanged between the FPD 105 and DVC 106 to confirm if the DVC 106 associates itself in the WLAN1. Reference numeral 601 denotes a wireless MAC frame, i.e., a Data frame, which includes a MAC header, a frame body, and the like. Reference numeral 602 denotes an IP packet as the frame body of the frame 601, and includes an IP header and data. Reference numeral 603 denotes a station confirmation and response packet as the data of the packet 602, and includes a command type, a confirmation IP address, and a confirmation BSSID.

The command type field stores one of values 0, 1, or 2, which respectively indicate a confirmation request, a positive response, and a negative response. The confirmation IP address field stores an IP address of the apparatus to be confirmed as to whether or not the apparatus is a station. The confirmation BSSID is a BSSID of a wireless network, and is an identifier of a network with which the apparatus as the transmission source of the packet associates. That is, the confirmation BSSID field stores the MAC address of the apparatus that creates the wireless network. For example, when the FPD 105 wants to confirm whether or not the DVC 106 is a station of the WLAN1, it stores "0," in the command type field, and the IP address of the DVC 106 in the confirmation IP address field. Also, the FPD 105 stores the MAC address of the AP 101 with which the FPD 105 associates in the confirmation BSSID field, and transmits the packet. Note that the FPD 105 broadcasts the packet. On the other hand, when the DVC 106 wants to transmit a response indicating that the DVC 106 itself is a station of the WLAN1 to the FPD 105, it transmits a packet in which "1" is stored in the command type field. Note that the DVC 106 unicasts the response packet.

Figure 7:
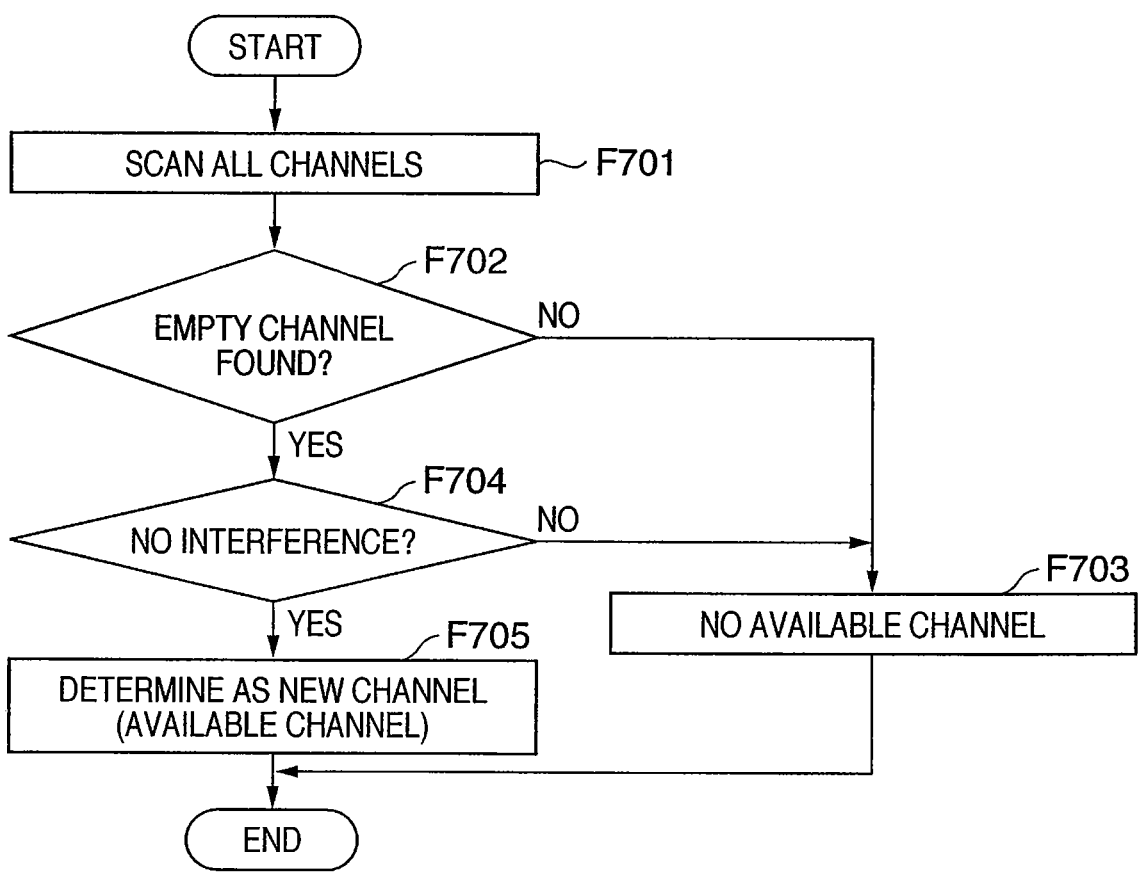
FIG. 7 is a flowchart of empty channel search processing according to the first through the third embodiments.

FIG. 7 is a flowchart of the empty channel search processing (F508) that is executed when the FPD 105 creates the WLAN2. The flow control is implemented when the control unit 201 of the FPD 105 controls the wireless unit 206 and the station function unit 207, in accordance with the programs stored in the program memory 203.

The FPD 105 scans all frequency channels using the wireless unit 206 (F701). The FPD 105 analyzes the scan result, and confirms if an empty channel is found (F702). If an empty channel is not found, the FPD 105 decides that there is no available channel (F703), and ends the processing, whereupon the process advances to step F507 in FIG. 5A. If an empty channel is found, the FPD 105 confirms if the empty channel interferes with channels in use (F704). For example, when the wireless unit 206 makes communications compliant to the IEEE802.11g standard, if a channel near four neighboring channels is in use, the FPD 105 decides that the empty channel interferes with channels in use. When the wireless unit 206 performs communication that is compliant to the IEEE802.11a standard, the FPD 105 decides that the empty channel does not interfere with channels in use.

If, as a result of confirmation in step F704, all empty channels interfere with channels in use, the FPD 105 decides that there is no available channel (F703) and ends the processing, whereupon the process advances to step F507 in FIG. 5A.

If an empty channel that does not interfere with channels in use is found, the FPD 105 decides the empty channel as an available channel to determine a new channel (F705) and ends the processing, whereupon the process advances to step F509 in FIG. 5A.

Figure 8:
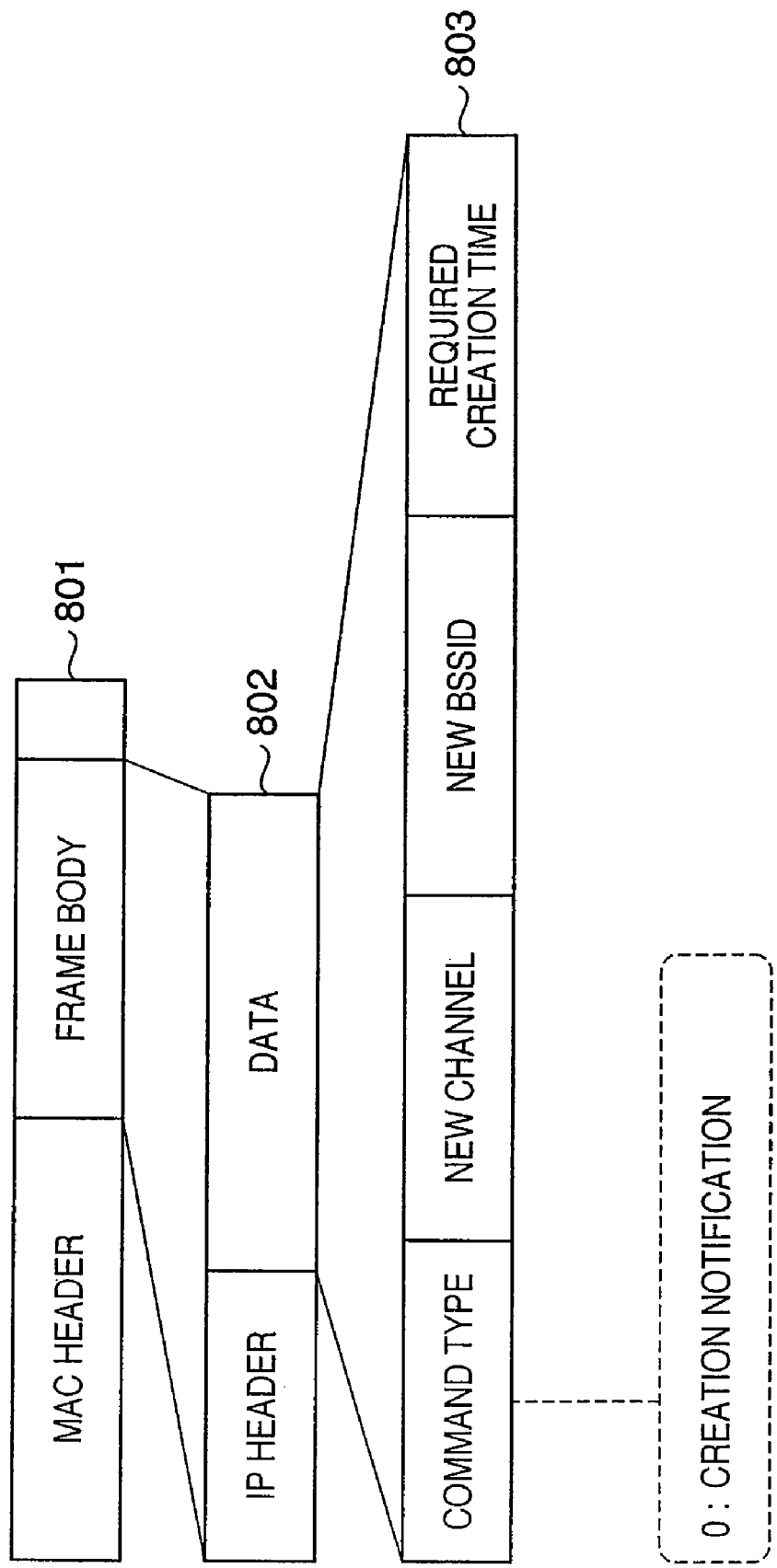
FIG. 8 shows the configuration of a new wireless network creation notification according to the first through the third embodiments.

FIG. 8 shows the configuration of the new wireless network creation notification that is transmitted from the FPD 105 to the DVC 106, so as to notify the DVC 106 of creation of the WLAN2.

Reference numeral 801 denotes a wireless MAC, i.e., a Data frame, which includes a MAC header, a frame body, and the like. Reference numeral 802 denotes an IP packet as the frame body of the frame 801, and includes an IP header and data. Reference numeral 803 denotes a new wireless network creation notification packet as the data of the packet 802, and includes a command type, a new channel, a new BSSID, and required creation time. The command type field stores "0", indicating a creation notification. The new channel field stores channel information used in a new wireless network to be created. The channel information uses a channel number that specifies the frequency channel. The new BSSID is a BSSID of a new wireless network to be created, and is an identifier of the new wireless network to be created. That is, the new BSSID field stores the MAC address of the apparatus, which creates a new wireless network.

The required creation time field stores an estimated time from the current timing, i.e., transmission timing of the new wireless network creation notification, until the new wireless network is created. For example, when the FPD 105 wants to notify the DVC 106 of creation of the new WLAN2, it stores "0" in the command type field, and a channel number of the determined new channel in the new channel field. Also, the FPD 105 stores its own MAC address in the new BSSID field. Furthermore, the FPD 105 stores, in the required creation time field, an estimated time after transmission of the new wireless network creation notification until the access point function unit 208 is activated to create a new network, from F511 to F513 in FIG. 5A or FIG. 5B, and then transmits the packet. Note that the FPD 105 broadcasts the packet.

Figure 9:
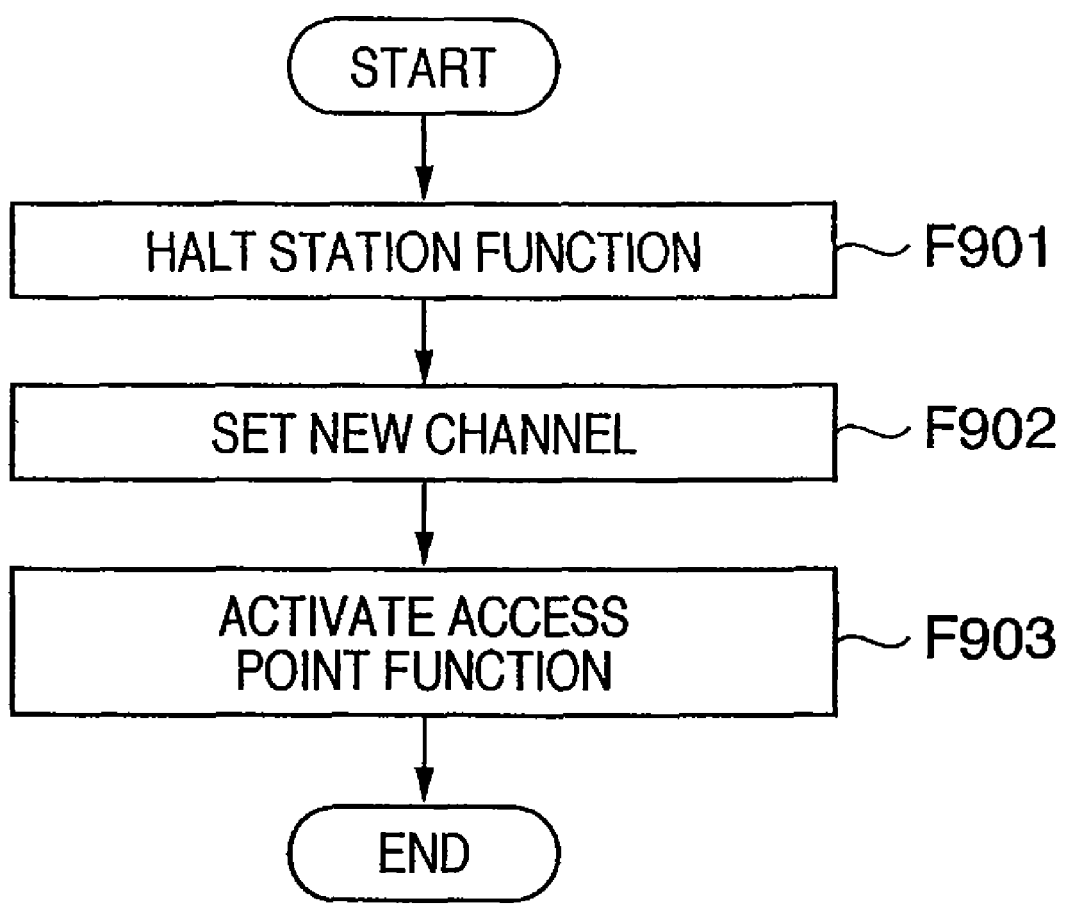
FIG. 9 is a flowchart of access point function activation processing according to the first through the third embodiments.

FIG. 9 is a flowchart showing the activation, processing of the access point function unit 208 that is executed when the FPD 105 creates the WLAN2 in step F513 in FIG. 5B. The flow control is implemented when the control unit 201 of the FPD 105 controls the wireless unit 206, the station function unit 207, and the access point function unit 208, in accordance with programs stored in the program memory 203. The station function unit 207 and the access point function unit 208 execute control according to programs stored therein, under the control of the control unit 201.

The FPD 105 halts the active station function (F901). The FPD 105 sets the new channel determined in step F705 in FIG. 7 in the wireless unit 206 as the channel of the WLAN2 (F902), and activates the access point function unit 208 (F903). When the access point function unit 208 is activated, it begins to periodically broadcast a beacon that stores the information of the new BSSID and various other kinds of information.

Figure 10:
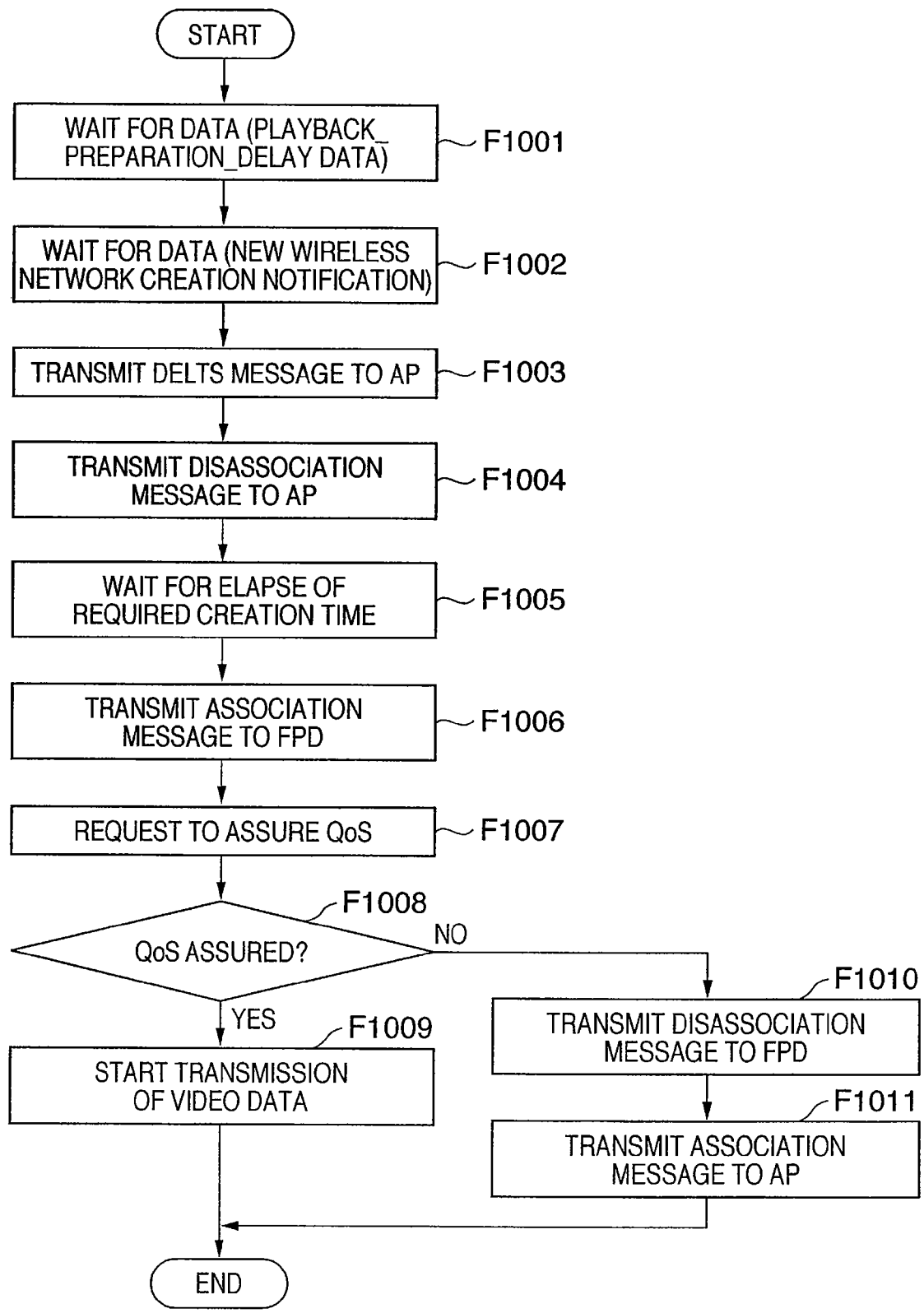
FIG. 10 is a flowchart when the video camera (DVC) 106 associates itself in a new network (WLAN2) created by the flat panel display (FPD) 105.

FIG. 10 is a flowchart that is executed when the DVC 106 associates itself in the second wireless network (WLAN2) created by the FPD 105. The flow control is implemented when the control unit 301 of the DVC 106 controls the wireless unit 306 and the station function unit 307, in accordance with the programs stored in the program memory 303. The station function unit 307 executes control according to a program stored therein, under the control of the control unit 301. The flow control in FIG. 10 starts immediately before, e.g., transmission of the playback_preparation_request data 401 in FIG. 4.

The DVC 106 waits for the playback_preparation_delay data from the FPD 105 (F1001). Upon reception of the playback_preparation_delay data from the FPD 105, the DVC 106 waits for the new wireless network creation notification from the FPD 105 (F1002). Upon reception of the new wireless network creation notification from the FPD 105, the DVC 106 transmits a DELTS message to the AP 101 (F1003) to cancel permission for the traffic of the video data 407 that is permitted with guarantee of the QoS. When a communication of the traffic of the video data is not permitted by the AP 101, the DVC 106 does not transmit any DELTS message.

Subsequently, the DVC 106 transmits a Disassociation message indicating disassociation from the WLAN1 to the AP 101 (F1004), and disassociates itself from the WLAN1. After disassociation from the WLAN1, the DVC 106 analyzes the new wireless network creation notification, and waits for an elapse of the time stored in the required creation time field (F1005). After the stored time has elapsed, the DVC 106 transmits an Association message indicating association in the second wireless network (WLAN2) created by the FPD 105 to the FPD 105 (F1006), and associates itself in the WLAN2. Upon transmission of the Association message from the DVC 106 to the FPD 105, the following methods are available.

As the first method, the DVC 106 analyzes the new wireless network creation notification received from the FPD 105, and scans the channel stored in the new channel field. The DVC 106 detects a beacon transmitted from the FPD 105. The DVC 106 then analyzes the contents of the beacon to confirm if the WLAN2 with the BSSID stored in the new BSSID field of the new wireless network creation notification is created, and executes step F1006.

As the second method, the DVC 106 analyzes the new wireless network creation notification received from the FPD 105, and confirms the channel stored in the new channel field and the BSSID stored in the new BSSID field. The DVC 106 then transmits a probe signal, i.e., a Probe_Request message, including the confirmed BSSID information, using the confirmed channel. The DVC 106 receives and analyzes a response, i.e., a Probe_Response Message, to the probe signal to confirm if the WLAN2 with the BSSID stored in the new BSSID field of the new wireless network creation notification is created, and executes step F1006.

After association in the WLAN2, the DVC 106 transmits an ADDTS_Request message corresponding to the ADDTS_Request message 402 to request the FPD 105 to permit QoS-guaranteed transmission for the traffic of the video data 407 (F1007). Upon reception of an ADDTS_Response message corresponding to the ADDTS_Response message 403 from the FPD 105, the DVC 106 confirms based on the contents of the received message if guarantee of the requested QoS is permitted (F1008). If the requested QoS is guaranteed, the DVC 106 begins to transmit the traffic of the video data 407 to the FPD 105. The DVC 106 transmits the traffic of the video data 407, using a QoS data frame. As a result, the FPD 105 plays back a stream of the video data 407 from the DVC 106. The DVC 106 and FPD 105 transmit and receive the traffic of the video data 407 while guarantee of the QoS at 8 Mbps is permitted by the FPD 105.

If the requested QoS is not assured by the FPD 105, the DVC 106 transmits a Disassociation message to the FPD 105 (F1010), and disassociates itself from the WLAN2. Then, the DVC 106 transmits an Association message to the WLAN1 created by the AP 101 (F1011), and associates itself in the WLAN1 again.

Figure 11:
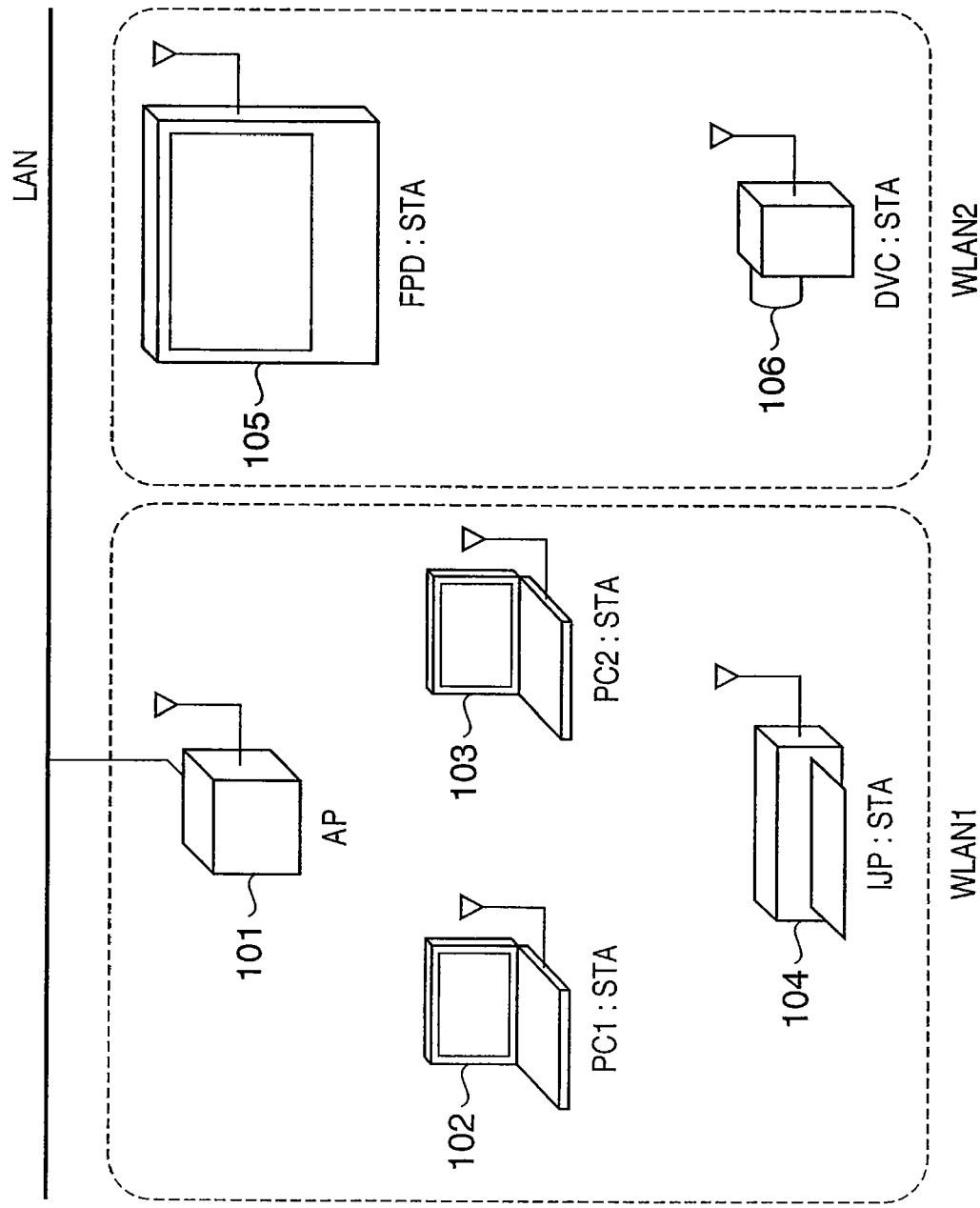
FIG. 11 is a diagram showing the configurations of WLAN1 and WLAN2 when the digital video camera (DVC) 106 associates itself in a new network (WLAN2) created by the flat panel display (FPD) 105 according to the first through the third embodiments.

FIG. 11 is a diagram showing the configurations of the WLAN1 and WLAN2 after the FPD 105 creates the WLAN2 and the DVC 106 associates itself in the WLAN2. The FPD 105 and DVC 106 thus disassociate themselves from the configuration of the WLAN1, and create the WLAN2, which is newly created by the FPD 105 and does not interfere with the WLAN1. In the WLAN2, upon issuance of a playback instruction of the video data 407 by the user using the FPD 105, the DVC 106 directly transmits playback_preparation_request data, corresponding to the playback_preparation_request data 401 in FIG. 4, to the FPD 105. Also, the FPD 105 directly transmits playback_preparation_completion data, corresponding to the playback_preparation_completion data 406, to the DVC 106. The DVC 106 transmits an ADDTS_Request message corresponding to the ADDTS_Request message 402 to the FPD 105. The FPD 105 receives the ADDTS_Request message corresponding to the ADDTS_Request message 402 from the DVC, and then transmits an ADDTS_Response message corresponding to the ADDTS_Response message 403 to the DVC 106. Furthermore, since the FPD 105 serves as the access point, and creates and manages the WLAN2, it need not transmit signals to the ADDTS_Request message 404 and the ADDTS_Response message 405 in FIG. 4. As a result, the DVC 106 need only be granted permission of guarantee of the QoS for the traffic of the video data 407 at 8 Mbps by the FPD 105. That is, guarantee of the QoS need only be assured between the FPD 105 and the DVC 106.

As described above, according to the embodiment, when the access point does not permit guarantee of the requested transmission data rate in communications between the devices via the access point, one device serves as an access point and creates a new network. The other device associates itself in the new network, and makes a communication while the required transmission data rate is assured. In this way, even when a communication with the expected transmission data rate cannot be made in the associated network, a communication with the expected transmission data rate can be made in the new network.

Second Embodiment

The second embodiment of the present invention will be described hereinafter. The embodiment will explain a process that is executed after a traffic communication of the video data 407 in FIG. 4. That is, the processing according to the embodiment is executed after the FPD 105 transmits the playback_preparation_completion data (F503) in FIG. 5A, receives the traffic of the video data 407, and plays back the video data 407. If the AP 101 denies guarantee of the QoS for the traffic of the video data 407 in step F502 in FIG. 5A, the processes in step F503 and subsequent steps are executed according to the first embodiment. According to the embodiment, the arrangements of the FPD 105 and DVC 106 are the same as per FIGS. 2 and 3.

Figure 12:
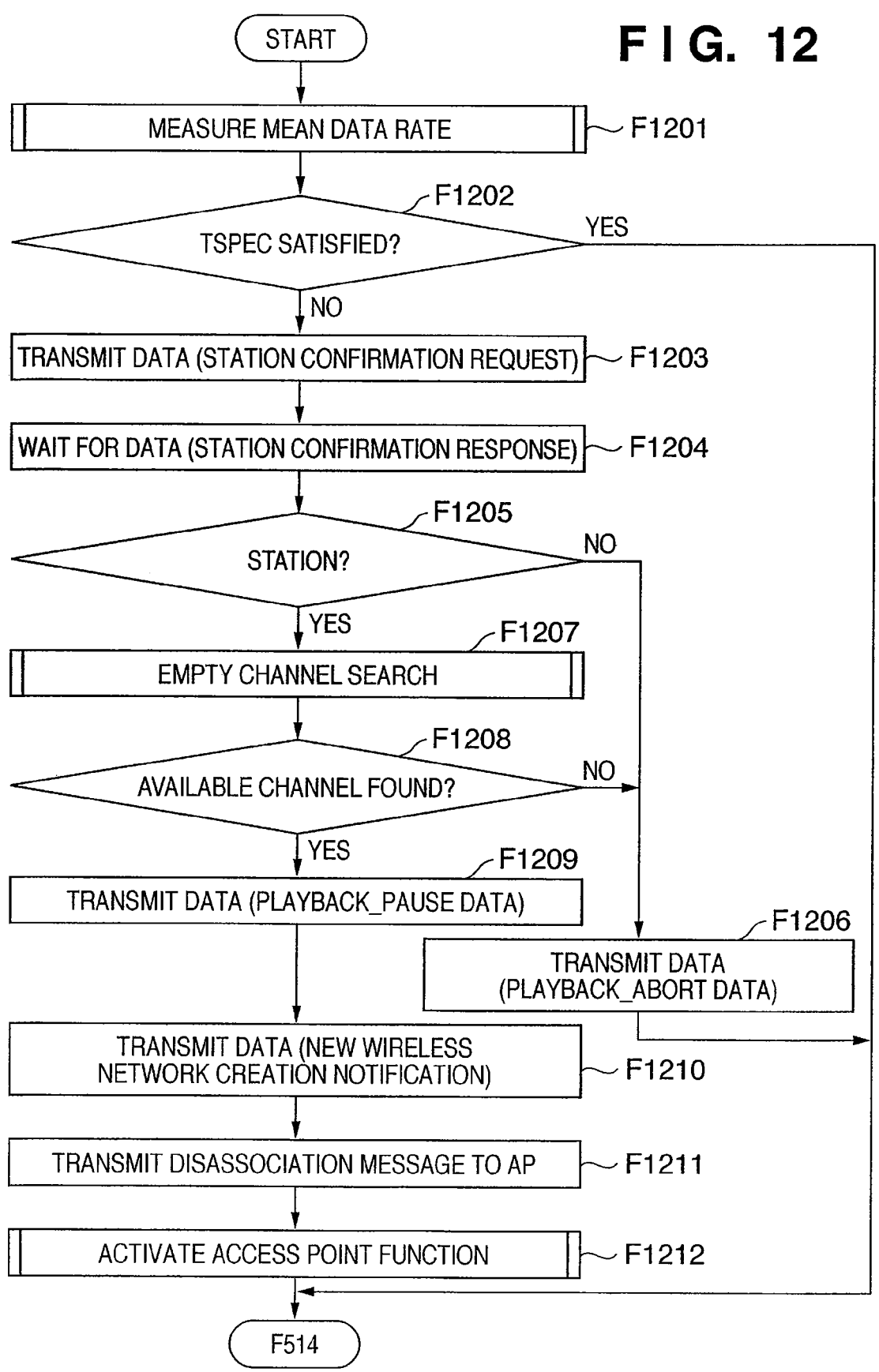
FIG. 12 is a flowchart executed when the flat panel display (FPD) 105 creates a new network (WLAN2) according to the second embodiment.

FIG. 12 is a flowchart executed until the FPD 105 creates a second wireless network (WLAN2). The flow control is implemented when the control unit 201 of the FPD 105 controls the wireless unit 206, the station function unit 207, and the access point control unit 208, in accordance with the programs stored in the program memory 203. The station function unit 207 and the access point function unit 208 execute control according to programs stored therein, under the control of the control unit 201. The flow control shown in FIG. 12 starts immediately after, e.g., the FPD 105 begins to receive the traffic of the video data 407 in FIG. 4.

The FPD 105 executes mean data rate measurement processing of the traffic of the video data 407 received from the DVC 106 via the AP 101 (F1201). The mean data rate measurement processing will be described hereinafter. The FPD 105 confirms based on the result of the mean data rate measurement processing if the measured mean data rate satisfies the TSPEC parameter (F1202). In the present circumstance, the FPD 105 confirms if the transmission data rate of 8 Mbps, which should be guaranteed by the AP 101, is satisfied. If the mean data rate satisfies the TSPEC parameter, the FPD 105 ends the processing, and restarts the processing in FIG. 12, after the elapse of a predetermined period of time.

If the mean data rate does not satisfy the TSPEC parameter, the FPD 105 transmits a station_confirmation_request message (F1203), and waits for a response to the request (F1204). Upon reception of the station_confirmation_response message from the DVC 106, the FPD 105 confirms if the DVC 106 is a station of the WLAN1 (F1205). If the DVC 106 is not a station of the WLAN1, the FPD 105 transmits playback_abort data to the DVC 106 via the AP 101 (F1206). Since the playback_abort data is transmitted, the DVC 106 aborts transmission of the traffic of the video data 407 in FIG. 4.

If, as a result of confirmation in step F1205, the DVC 106 is a station of the WLAN1, the FPD 105 executes the processing in FIG. 7 to search for empty wireless channels (F1207). After the empty channel search processing, the FPD 105 confirms if an available channel is found (F1208). If an available channel is not found, the FPD 105 transmits playback_abort data to the DVC 106 via the AP 101 (F1206), and ends the processing. If an available channel is found, the FPD 105 transmits playback_pause data to the DVC 106 via the AP 101 (F1209). Since the playback_pause data is transmitted in the present circumstance, the DVC 106 pauses transmission of the traffic of the video data 407 in FIG. 4. The FPD 105 transmits a new wireless network creation notification (FIG. 8) to the DVC 106 via the AP 101 (F1210). Furthermore, the FPD 105 transmits a Disassociation message to the AP 101 (F1211), and disassociates itself from the WLAN1. After disassociation from the WLAN1, the FPD 105 executes activation processing of the access point function unit 208 so as to create WLAN2 by itself (F1212). As the activation processing of the access point function unit 208, the FPD 105 executes the same processing as per FIG. 9. After the access point function unit 208 is activated, the process advances to step F514 in FIG. 5B, and the FPD 105 executes the same processes as per steps F514 to F520.

Figure 13:
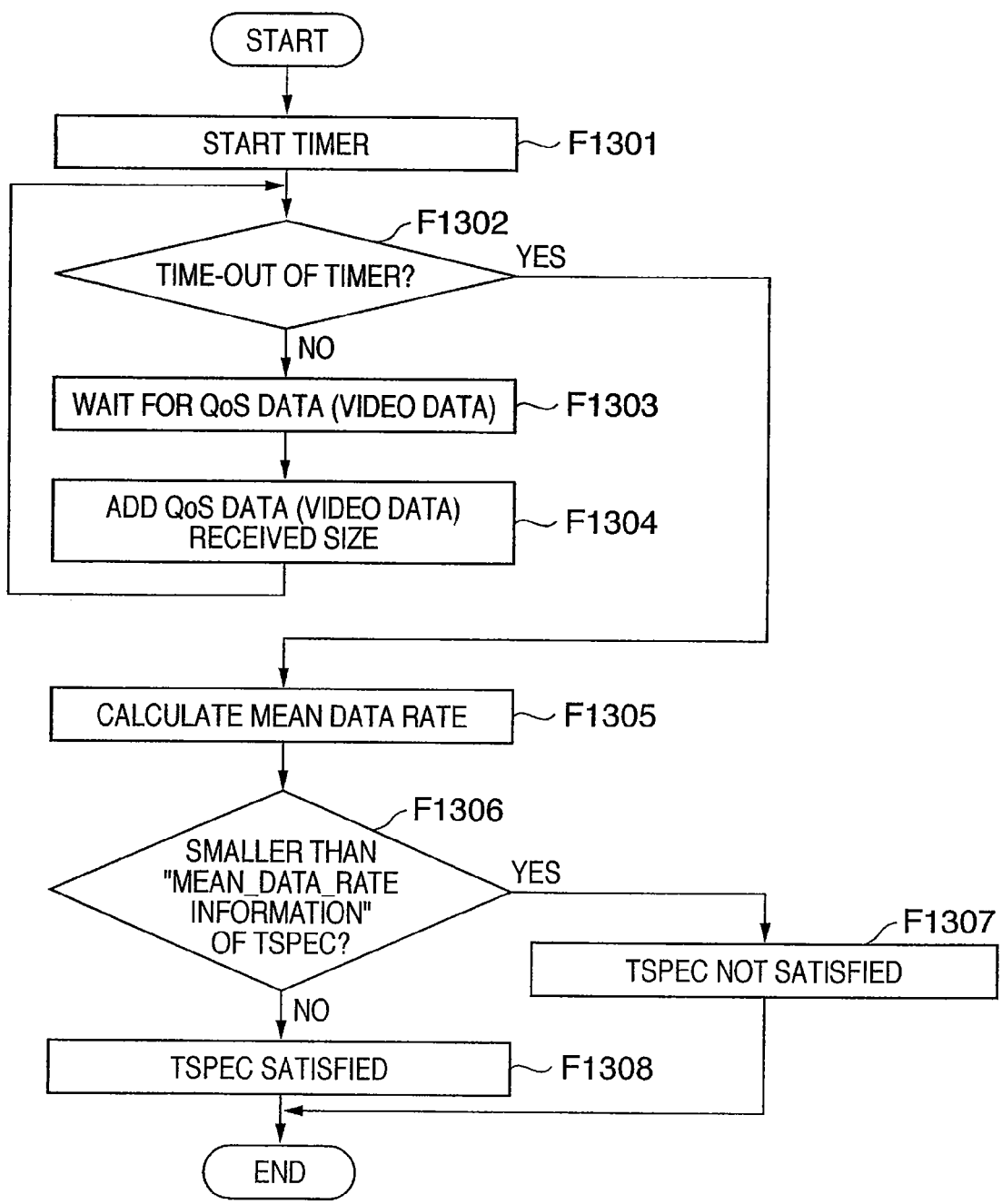
FIG. 13 is a flowchart of mean data rate measurement processing according to the second embodiment.

FIG. 13 is a flowchart showing the mean data rate measurement method (F1201) and the discrimination method in step F1202 that are executed when the FPD 105 creates the WLAN2. The flow control is implemented when the control unit 201 of the FPD 105 controls the wireless unit 206 and the station function unit 207, in accordance with the programs stored in the program memory 203.

In order to measure a mean data rate, the FPD 105 starts a timer for a predetermined period of time (F1301). The FPD 105 then checks if the timer has reached a time-out (F1302). If the timer has not reached a time-out, the FPD 105 waits for reception of a QoS Data frame for the traffic of the video data 407, i.e., data corresponding to the video data 407 in FIG. 4 from the DVC 106 (F1303). Upon reception of the QoS Data frame, the FPD 105 adds the received size of the received QoS Data frame to the total received size of the QoS Data frame received after the start of the timer (F1304), and the process returns to step F1302. On the other hand, if the timer has reached a time-out in step F1302, the FPD 105 divides the received size by the predetermined period of time to calculate a mean data rate (F1305). That is, the FPD 105 calculates a mean data rate per unit time of the video data 407 received from when the start of the timer (F1301) until time-out of the timer (F1302).

The FPD 105 then compares the calculated mean data rate with the Mean_Data_Rate information value in the TSPEC parameter (F1306). If the calculated mean data rate is smaller than Mean_Data_Rate information value, the FPD 105 decides that the mean data rate does not satisfy the TSPEC parameter (F1307), and the process advances to step F1203 in FIG. 12. As a result of the comparison, if the calculated mean data rate is larger than the Mean_Data_Rate information value, the FPD 105 decides that the mean data rate satisfies the TSPEC parameter (F1308). The FPD 105 then ends the processing, and restarts the processing in FIG. 12, after the elapse of a predetermined period of time.

Figure 14:
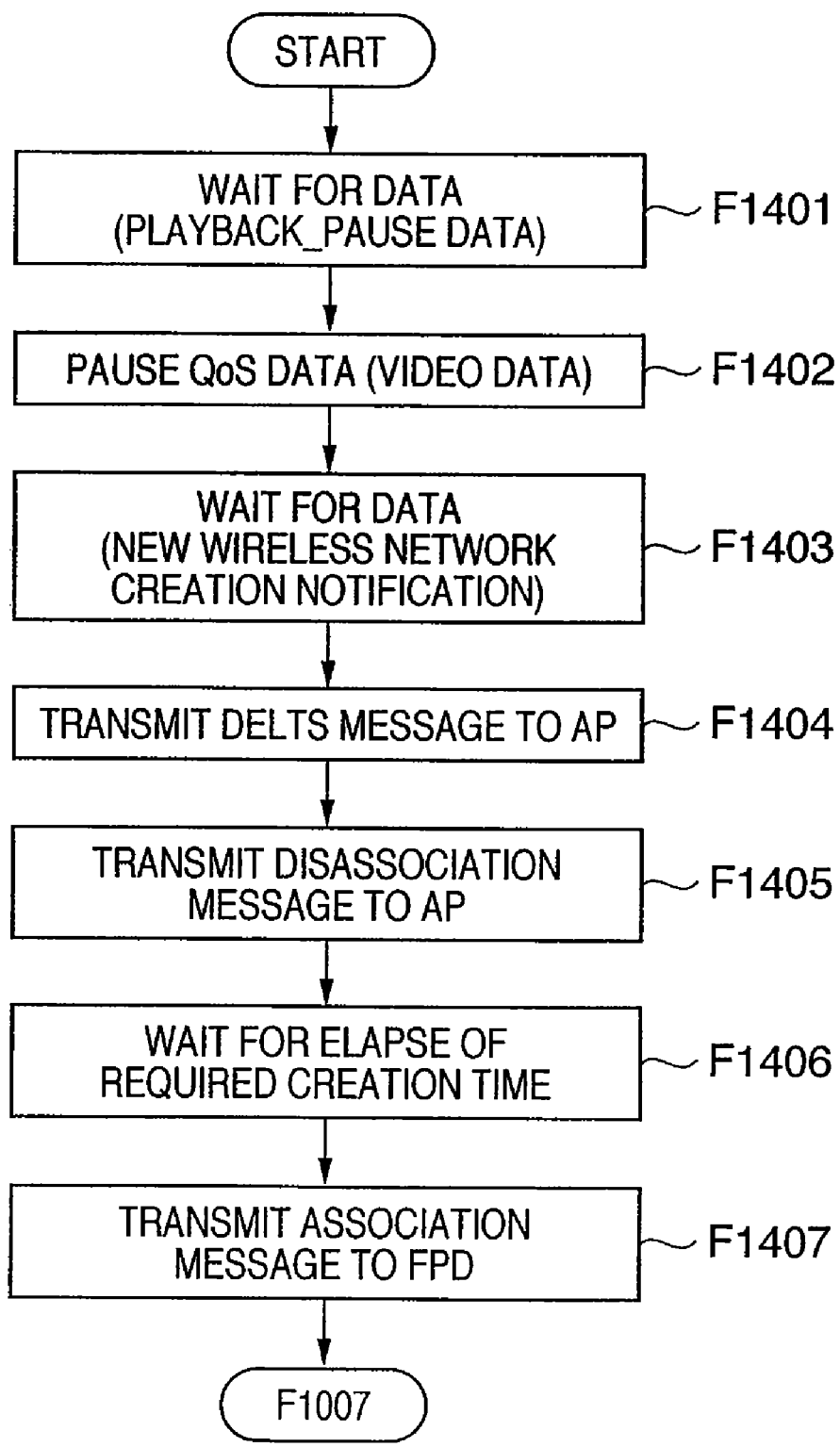
FIG. 14 is a flowchart executed when the digital video camera (DVC) 106 associates itself in a new network (WLAN2) created by the flat panel display (FPD) 105 according to the second embodiment.

FIG. 14 is a flowchart executed until the DVC 106 associates itself in the second wireless network (WLAN2) created by the FPD 105. The flow control is implemented when the control unit 301 of the DVC 106 controls the wireless unit 306 and the station function unit 307, in accordance with the programs stored in the program memory 303. The station function unit 307 executes control according to the program stored therein under the control of the control unit 301. The flow control in FIG. 14 starts immediately after, e.g., the DVC 106 begins to transmit the traffic of the video data 407 in FIG. 4.

The DVC 106 waits for the playback_pause data from the FPD 105 (F1401). Upon reception of the playback_pause data from the FPD 105, the DVC 106 pauses playback of the video data 407, i.e., it pauses transmission of the QoS Data frame (F1402). The DVC 106 then waits for the new wireless network creation notification from the FPD 105 (F1403). Upon reception of the new wireless network creation notification from the FPD 105, the DVC 106 transmits a DELTS message to the AP 101 (F1404) to cancel permission for the traffic of the video data 407, which is permitted with guarantee of the QoS. Subsequently, the DVC 106 transmits a disassociation message indicating disassociation from the WLAN1 to the AP 101 (F1405), and disassociates itself from the WLAN1. After disassociation from the WLAN1, the DVC 106 analyzes the new wireless network creation notification received from the FPD 105 and waits for an elapse of a time stored in the required creation time field (F1406). After the elapse of time, the DVC 106 transmits an association message, indicating association in the second wireless network (WLAN2) created by the FPD 105 to the FPD 105 (F1407), and associates itself in the WLAN2. Upon transmission of the association message from the DVC 106 to the FPD 105, the following methods are available.

As the first method, the DVC 106 analyzes the new wireless network creation notification received from the FPD 105, and scans the channel stored in the new channel field. The DVC 106 detects a beacon transmitted from the FPD 105. The DVC 106 then analyzes the contents of the beacon to confirm if the WLAN2 with the BSSID stored in the new BSSID field of the new wireless network creation notification, and executes step F1006.

As the second method, the DVC 106 analyzes the new wireless network creation notification received from the FPD 105, and confirms the channel stored in the new channel field and the BSSID stored in the new BSSID field. The DVC 106 then transmits a probe signal (Probe_Request message), including the confirmed BSSID information using the confirmed channel. The DVC 106 receives and analyzes a response (Probe_Response Message) to the probe signal to confirm if the WLAN2 is created with the BSSID stored in the new BSSID field of the new wireless network creation notification, and executes step F1006.

After the DVC 106 associates itself in the WLAN2 created by the FPD 105, the process advances to step F1007 in FIG. 10, and the DVC 106 executes the same processes as those in steps F1007 to F1011.

As described above, according to the embodiment, when the current communication cannot assure the transmission data rate, which should be guaranteed by the AP, one device serves as an access point, and creates a new network. The other device associates itself in the new network and makes a communication while assuring the requested transmission data rate. Hence, even when a communication at the transmission data rate that should be guaranteed can no longer be made, a communication can be made in the new network at the expected transmission data rate.

Third Embodiment

The third embodiment of the present invention will be described hereinafter. Again, according to the embodiment, the arrangements of the FPD 105 and DVC 106 are the same as per FIGS. 2 and 3. The embodiment will describe an example in which the FPD 105 checks if a communication at the requested transmission data rate can be made in the WLAN1, and creates a new network depending on the result of the check.

Figure 15:
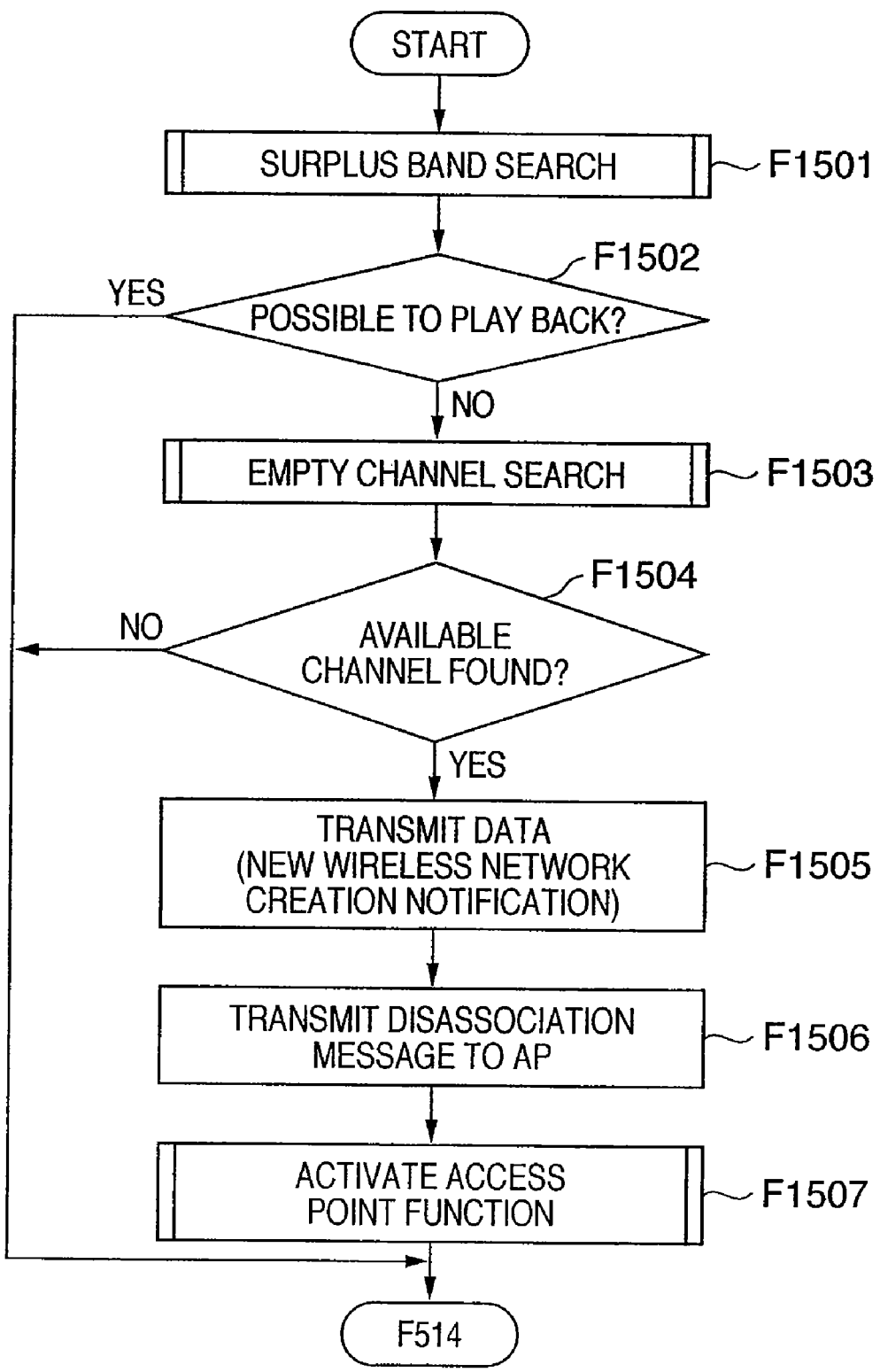
FIG. 15 is a flowchart executed when the flat panel display (FPD) 105 creates a new network (WLAN2) according to the third embodiment.

FIG. 15 is a flowchart that is executed until the FPD 105 creates a second wireless network (WLAN2). The flow control is implemented when the control unit 201 of the FPD 105 controls the wireless unit 206, a station function unit 207, and an access point function unit 208 in accordance with the programs stored in the program memory 203. The flow control of FIG. 15 starts immediately after, e.g., the FPD 105 associates itself in the WLAN1 or after the FPD 105 receives the playback_preparation_request data 401 from the DVC 106.

The FPD 105 executes surplus band search processing in the WLAN1 (F1501). The FPD 105 confirms if the video data 407 can be played back using the found surplus band, based on the surplus band search processing (F1502). The surplus band search processing and the confirmation as to whether or not the video data 407 can be played back will be described hereinafter. If the video data 407 can be played back, the FPD 105 ends the processing, and executes the same processing as in FIG. 4.

On the other hand, if the video data 407 cannot be played back, the FPD 105 executes the processing in FIG. 7 to search for empty wireless channels (F1503). After the empty channel search processing, the FPD 105 confirms whether or not an available channel is found (F1504). If an available channel is not found, the processing ends. If an available channel is found, the FPD 105 transmits a new wireless network creation notification (FIG. 8) to the DVC 106 via the AP 101 (F1505). The FPD 105 then transmits a disassociation message to the AP 101 (F156), and disassociates itself from the WLAN1. After disassociation from the WLAN1, the FPD 105 executes activation processing of the access point function unit 208 (F1507). As the activation processing of the access point function unit 208, the FPD 105 executes the same processing as that described using FIG. 9. After the access point function unit 208 is activated, the process advances to step F514 in FIG. 5B, and the FPD 105 executes the same processes as per steps F514 to F520.

Figure 16:
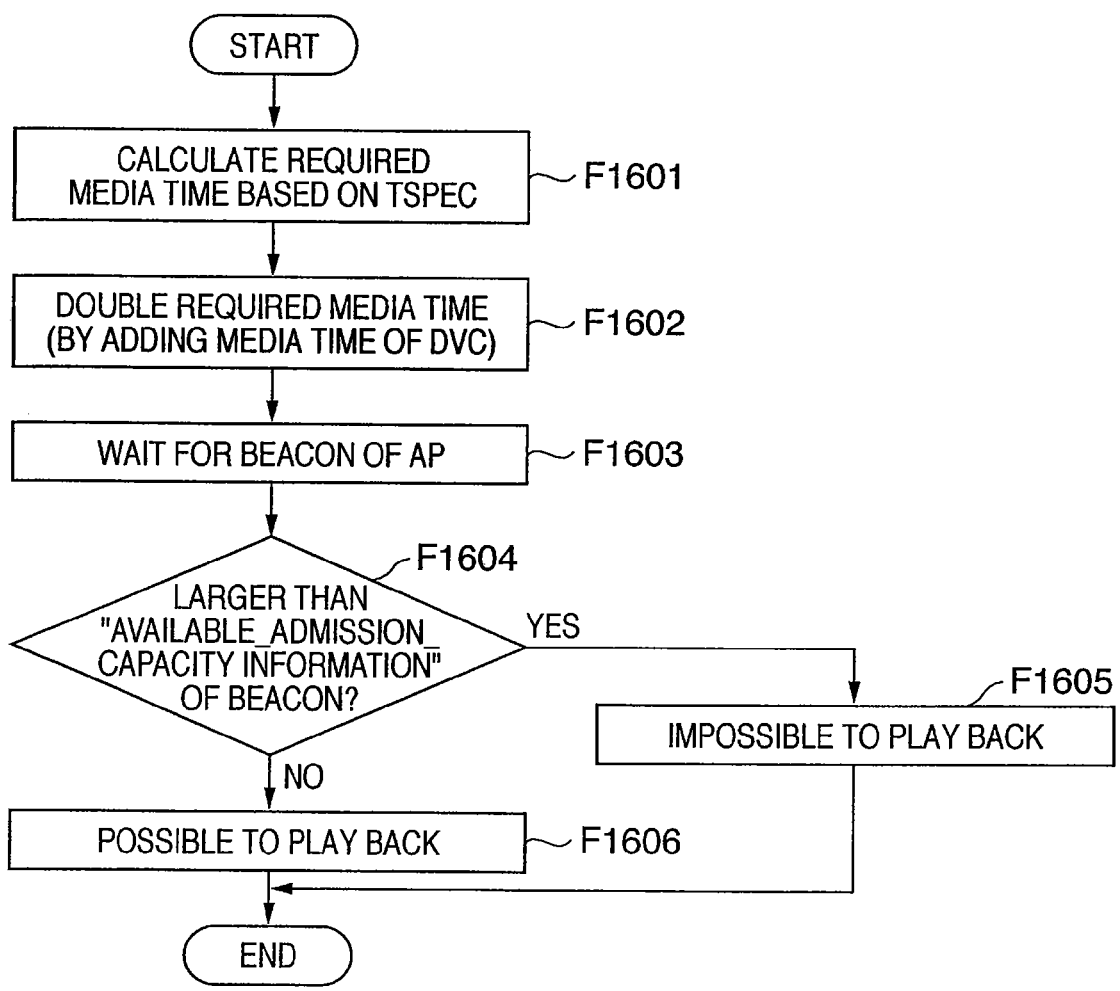
FIG. 16 is a flowchart of surplus band search processing according to the third embodiment.

FIG. 16 is the surplus band search method (F1501) and the discrimination method in step F1502 that is executed when the FPD 105 creates the WLAN2.

The FPD 105 calculates a required media time, based on a variety of parameters, that the AP 101 is to be requested and notified, upon requesting the AP 101 to permit QoS guarantee of the traffic of the video data 407 (F1601). The variety of parameters include such TSPEC parameters as Nominal_MSDU_Size information, Mean_Data_Rate information, Minimum_PHY_Rate information, and Surplus_Band_Allowance information. As a calculation formula used to calculate the required media time, the formula described in IEEE Std 802.11e™-2005, Annex K (K.2.2) is used. The FPD 105 doubles the required media time calculated in step F1601 to add a media time that the DVC 106 which transmits the traffic of the video data 407 will require (F1602) to obtain a new required media time. That is, the FPD 105 calculates a required media time for a communication between the FPD 105 and AP 101, and for a communication between the DVC 106 and AP 101. The required media time is a transmission band required to transmit the traffic of the video data 407.

Subsequently, the FPD 105 waits for reception of a beacon from the AP 101 (F1603). Upon reception of the beacon, the FPD 105 analyzes the beacon, and confirms the surplus available transmission band in the WLAN1 created by the AP 101. The confirmation can be attained using Available_Admission_Capacity information as information included in the beacon. The FPD 105 compares the required media time (required band) calculated in step F1602 and the available transmission band confirmed from the beacon (F11604). If, as a result of the comparison, the calculated required media time, i.e., the required band, is larger than the available transmission band, the FPD 105 decides that it is impossible to play back video data (F1605). In such a circumstance, the FPD 105 decides that the AP 101 is unlikely to permit the DVC 106 and the FPD 105 to assure the QoS for the transmission and reception of the traffic of the video data 407. Or the FPD 105 decides that the expected QoS is unlikely to be assured even when the AP 101 permits. On the other hand, if the required media time is smaller than the allowable transmission band, the FPD 105 decides that it is possible to play back video data (F1606).

Figure 17:
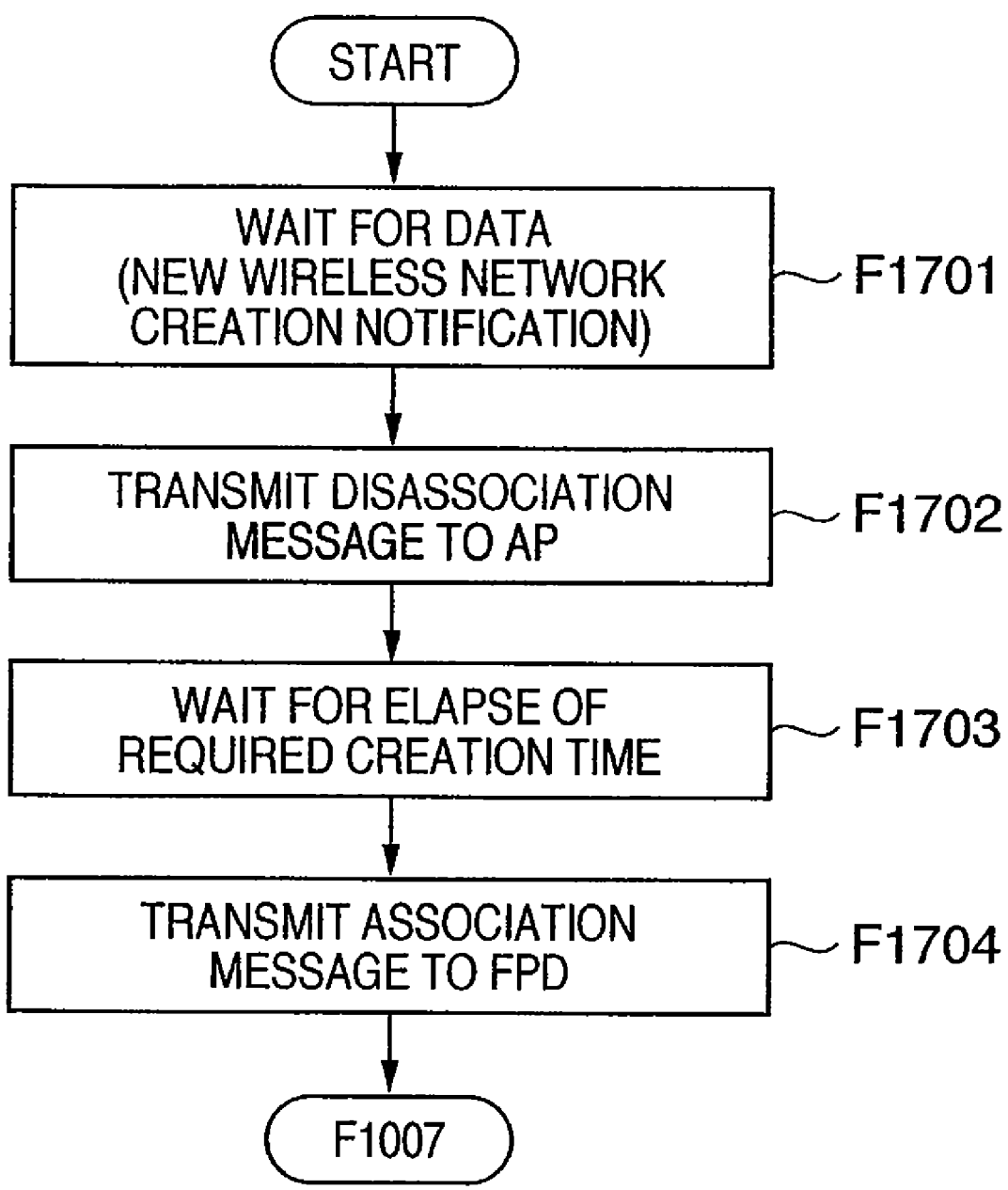
FIG. 17 is a flowchart executed when the digital video camera (DVC) 106 associates itself in a new network (WLAN2) created by the flat panel display (FPD) 105 according to the third embodiment.

FIG. 17 is a flowchart executed until the DVC 106 associates itself in the second wireless network (WLAN2) created by the FPD 105. The flow control is implemented when the control unit 301 of the DVC 106 controls the wireless unit 306 and station function unit 307 in accordance with the programs stored in the program memory 303. The station function unit 307 executes control according to a program stored therein, under the control of the control unit 301. The flow control of FIG. 17 starts immediately after, e.g., the DVC 106 associates itself in the WLAN1.

The DVC 106 waits for the new wireless network creation notification from the FPD 105 (F1701). Upon reception of the new wireless network creation notification from the FPD 105, the DVC 106 transmits a disassociation message indicating disassociation from the WLAN1 to the AP 101 (F1702), and disassociates itself from the WLAN1. After disassociation from the WLAN1, the DVC 106 analyzes the new wireless network creation notification received from the FPD 105 and waits for an elapse of the time that is stored in the required creation time field (F1703). After the elapse of the time, the DVC 106 transmits an association message indicating association in the second wireless network (WLAN2) created by the FPD 105 to the FPD 105 (F1704), and associates itself in the WLAN2. The processing executed upon transmitting the association message from the DVC 106 to the FPD 105 is as according to the first and second embodiments.

When the DVC 106 associates itself in the WLAN2 created by the FPD 105, the process advances to step F1007 in FIG. 10, and the DVC 106 executes the same processes as per steps F1007 to F1010.

As described above, according to the embodiment, one device as a station decides if the access point can assure the required transmission data rate. The device as the station activates the access point function according to the result thereof to serve as an access point and creates a new network. The other device associates itself in the new network and makes a communication while the required transmission data rate is assured. Hence, a communication at the expected transmission data rate can be made in the new network without any request for the transmission data rate, which is unlikely to be assured by the access point. Even when the access point permits guaranteeing the QoS, and a communication at the expected transmission data rate is unlikely to be made, a communication at the expected transmission data rate can be made in the new network. Therefore, the wasteful processing can be omitted, and a communication at the expected transmission data rate can be quickly started.

Fourth Embodiment

The fourth embodiment of the present invention will be described hereinafter. The embodiment is executed when the WLAN2 is created by the first, second, or third embodiment, the DVC 106 associates itself in the WLAN2, and playback of the video data 407 is completed.

Figure 18:
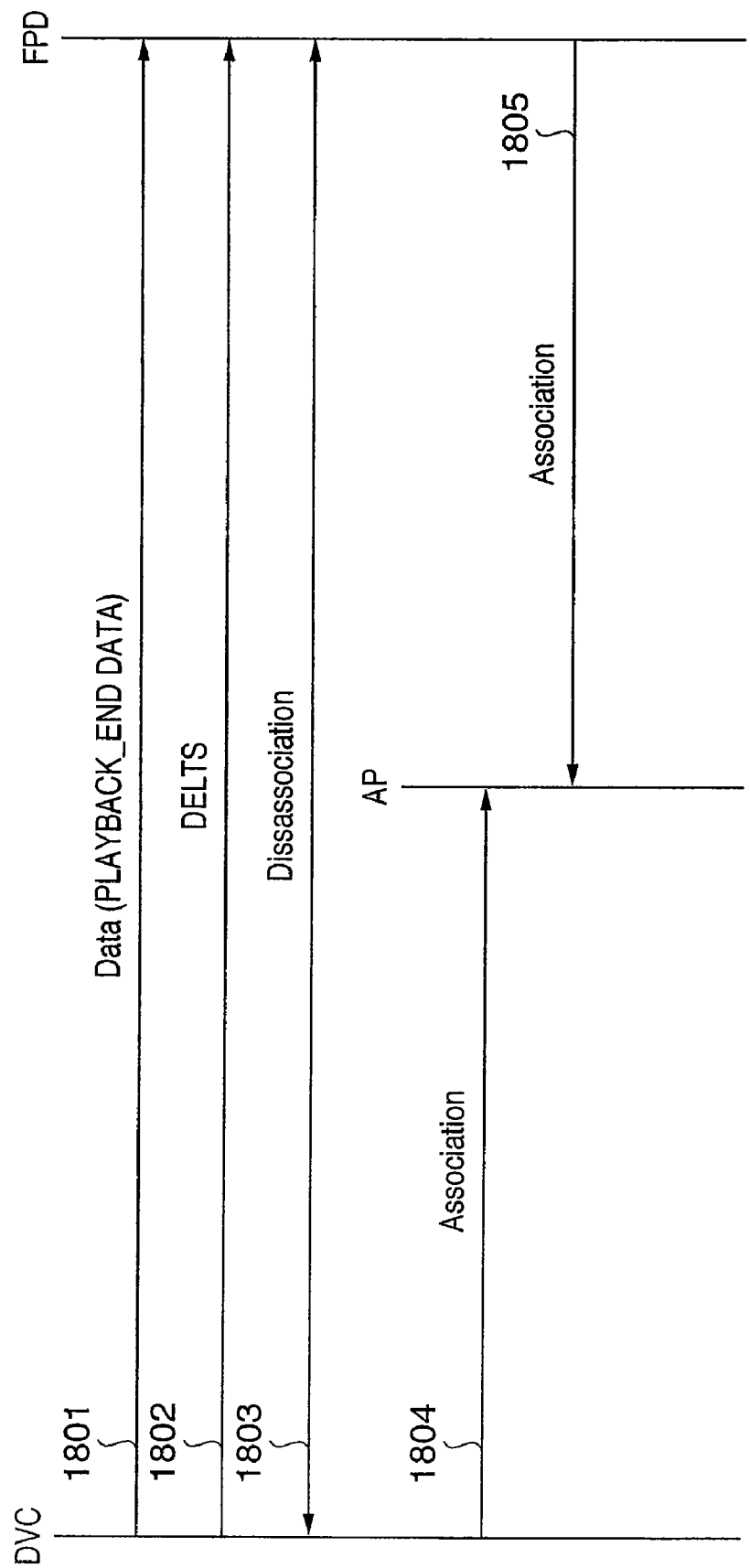
FIG. 18 is a sequence chart executed after WLAN2 is created, the DVC 106 associates itself in WLAN2, and playback of video data ends, according to the fourth embodiment.

FIG. 18 is a sequence chart after the DVC 106 plays back the video data 407 using the FPD 105, and the playback is completed.

Upon completion of the transmission of the traffic of all the video data 407 from the DVC 106, the DVC 106 transmits playback_end data (1801) to the FPD 105. The playback_end data is a signal that is transmitted using a Data frame, and which notifies the FPD 105 of the end of playback. The DVC 106 transmits a DELTS message (1802) to the FPD 105 to cancel permission for the traffic of the video data 407, which is permitted to assure the QoS.

The DVC 106 then transmits a disassociation message (1803) indicating disassociation from the WLAN2 to the FPD 105, and disassociates itself from the WLAN2. Thereafter, the DVC 106 transmits an Association message indicating association in the first wireless network (WLAN1) created by the AP 101 to the AP 101, and associates itself in the WLAN1 again.

On the other hand, upon reception of the disassociation message (1803) from the DVC 106, the FPD 105 confirms disassociation of the DVC 106 from the WLAN2. After the confirmation of disassociation of the DVC 106 from the WLAN2, the FPD 105 discards the created WLAN2. The FPD 105 then halts the operation of the access point function unit 208, and restarts the operation of the station function unit 207. After the station function restarts, the FPD 105 transmits an association message (1805), indicating association in the first wireless network (WLAN1) created by the AP 101 to the AP 101, and associates itself in the WLAN1. As a result, when the QoS need not be assured anymore for the traffic of the video data 407, the FPD 105 and DVC 106 associate themselves in the WLAN1 again, and the configuration of the WLAN1 returns to the state shown in FIG. 1. The FPD 105 stores the information of the WLAN1, e.g., the channel number, BSSID, and the like of the WLAN1, before the flow for creating the WLAN2 described according the first, second, or third embodiment ends. The DVC 106 similarly saves the information of the WLAN1 before the flow for associating the DVC 106 itself in the WLAN2 described according to the first, second, or third embodiment starts. The FPD 105 and DVC 106 can associate themselves in the WLAN1 again using the saved information of the WLAN1.

As described above, according to the embodiment, when the QoS need not be assured any more, the devices associate themselves in the previous network again, and can communicate with those which associate themselves in the previous network. Since the devices can communicate with an access point connected to the wired LAN, a communication via the wired LAN can also be made.

Note that the embodiments have explained the case of the IEEE802.11 standard. However, the present invention can also be applied to other communication schemes such as Ultra Wide Band (UWB).

As described above, transmission/reception of traffic with a certain characteristic can be made to function as expected, Or the possibility of making such communication function as expected can be enhanced.

Since a new network that does not influence the communication of the existing network is created, the communication can be made without disturbing the communication of other devices, or being disturbed thereby.

The present invention can also be achieved by supplying a recording medium that stores a program code of software that implements the aforementioned embodiments to a system or apparatus, and reading out and executing the supplied program code by a computer of that system or apparatus. The computer includes a control unit such as a CPU, MPU, or the like. In such a circumstance, the program code itself read out from the recording medium implements the functions of the embodiments, and the recording medium that stores the program code constitutes the present invention.

As the recording medium for supplying the program code, for example, a flexible disk, hard disk, optical disk, magneto-optical disk, CD-ROM, CD-R, magnetic tape, nonvolatile memory card, ROM, DVD, and the like may be used.

The present invention also includes a case wherein the embodiments are implemented by some or all processes executed by an operating system (OS) or the like which runs on the computer executes based on instructions of the program code.

Furthermore, the present invention includes a case wherein the embodiments are implemented by some or all of the actual processes executed by a control unit of a function expansion unit based on a program code which is written in a memory that is part of a function expansion unit that is inserted in the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-208496, filed Jul. 31, 2006, which is hereby incorporated by reference herein in its entirety.

What is claimed is:

1. A communication apparatus comprising:
a wireless unit that performs wireless communication;
a station function unit that provides a station function which associates and communicates with a first wireless network created by a first access point apparatus by using the wireless unit;
an access point function unit, which provides an access point function to the communication apparatus, and, by using the wireless unit, creates a second wireless network and manages communication within said second wireless network, wherein said communication apparatus functions as a second access point apparatus; and
a controller;
wherein, when operating in the station function, the controller determines whether or not communication of specific traffic characteristics can be made between the present apparatus and a communication partner apparatus in the first network, and
when the controller determines that communication of the specific traffic characteristics can not be made while operating in the station function, the controller executes control of the communication apparatus so as to perform communication of the specific traffic characteristics with the communication partner apparatus in the second wireless network.

2. The apparatus according to claim 1, wherein the control executed by the controller discriminates whether or not the apparatus and the communication partner apparatus belong to the same wireless network,
if it is determined that the apparatus and the communication partner apparatus belong to the same wireless network, the apparatus confirms whether or not to create a wireless network in which communication of the specific traffic characteristics can be made.

3. The apparatus according to claim 1, wherein the control executed by the controller confirms whether a channel is available, by which a wireless network can be made for the purpose of communication of said specific traffic characteristics.

4. The apparatus according to claim 1, wherein the control by the controller notifies the communication partner apparatus of information associated with the network to be created by the access point function unit.

5. The apparatus according to claim 1, wherein the control by the controller dissociates the communication apparatus from the first wireless network.

6. The apparatus according to claim 1, wherein the specific traffic characteristics are traffic characteristics requested by the communication partner apparatus.

7. The apparatus according to claim 1, wherein the controller further executes control to associate the communication apparatus with the first wireless network after completion of the communication with the communication partner apparatus in the second wireless network.

8. The apparatus according to claim 1, wherein the controller determines, when operating in the station function, whether or not communication of the specific traffic characteristics can be made with a communication partner apparatus based on information received from the first access point apparatus.

9. The apparatus according to claim 8, wherein the controller requests the first access point apparatus to ensure said specific traffic characteristics, and
wherein the controller determines whether or not communication of the specific traffic characteristics can be made with a communication partner apparatus based on a response from the first access point apparatus to the request.

10. The apparatus according to claim 8, wherein the controller determines whether or not communication of the specific traffic characteristics can be made with a communication partner apparatus based on information associated with surplus bandwidth of the first wireless network managed by the first access point apparatus.

11. The apparatus according to claim 1, wherein the controller determines whether or not the communication of the specific traffic characteristics can continue immediately after the communication of the specific traffic characteristics starts.

12. The apparatus according to claim 11, wherein the controller determines whether or not the communication of the specific traffic characteristics can continue, based on a data rate for a predetermined period of time after the beginning of communication of the specific traffic characteristic.

13. A communication apparatus comprising:
a wireless unit that performs wireless communication;
a station function unit that provides a station function which associates and communicates with a wireless network created by a first access point apparatus by using the wireless unit; and
a controller;
wherein, when the communication apparatus associates with a wireless network created by the first access point apparatus, the controller requests for communication of specific traffic characteristics; and
after said request is made, the controller executes control of the communication apparatus so as to associate with a wireless network created by a communication partner apparatus, and executes control of the communication apparatus so as to perform communication of specific traffic characteristics with the communication partner apparatus in the wireless network created by an access point function.

14. The apparatus according to claim 13, wherein the controller, on the basis of the information received from the communication partner apparatus, confirms that the wireless network was created by the communication partner apparatus and, if said network exists, associates with it.

15. The apparatus according to claim 13, wherein the controller reassociates with the network created by the first access point apparatus after completion of communication with the communication partner apparatus in the network created by the communication partner apparatus.

16. A communication method for a communication apparatus, said method comprising:
a wireless step of performing wireless communication;
a station function step of providing a station function of the communication apparatus which associates and communicates with a first wireless network created by a first access point apparatus, by using a wireless communication functionality of the communication apparatus;
an access point step of providing an access point function to the communication apparatus, and, by using the wireless communication functionality of the communication apparatus, creating a second wireless network and managing communication within said second wireless network, wherein said communication apparatus functions as a second access point apparatus;
a determining step of determining, when the communication apparatus operates in the station function, whether or not communication of specific traffic characteristics can be made between the communication apparatus and a communication partner apparatus in the first wireless network; and
an executing step of executing, when the determining step determines that communication of the specific traffic characteristics can not be made while the communication apparatus operates in the station function, control of the communication apparatus so as to perform communication of specific traffic characteristics with the communication partner apparatus in the second wireless network.

17. A communication method for a communication apparatus, said method comprising:
a wireless step of performing wireless communication;
a station function step of providing a station function of the communication apparatus which associates and communicates with a wireless network created by a first access point apparatus by using a wireless communication functionality of the communication apparatus;
a controlling step of, when the communication apparatus associates with a wireless network created by the first access point apparatus, requesting for communication of specific traffic characteristics; and
an executing step of, after said requesting is made, executing control of the communication apparatus so as to associate with a wireless network created by a communication partner apparatus and to perform communication of specific traffic characteristics with the communication partner apparatus in the wireless network created by an access point function.

18. A non-transitory computer-readable storage medium storing a program for making a computer control a communication apparatus, which has a management function of creating and managing a network, and a function to be managed, said program comprising:
a wireless step of performing wireless communication;
a station function step of providing a station function of the communication apparatus which associates and communicates with a first wireless network created by a first access point apparatus, by using a wireless communication functionality of the communication apparatus;
an access point step of providing an access point function to the communication apparatus, and, by using the wireless communication functionality of the communication apparatus, creating a second wireless network and managing communication within said second wireless network, wherein said communication apparatus functions as a second access point apparatus;
a determining step of determining, when the communication apparatus operates in the station function, whether or not communication of specific traffic characteristics can be made between the communication apparatus and a communication partner apparatus in the first network; and
an executing step of executing, when the determining step determines that communication of the specific traffic characteristics can not be made while the communication apparatus operates in the station function, control of the communication apparatus so as to perform communication of specific traffic characteristics with the communication partner apparatus in the second wireless network.

* * * * *